(12) United States Patent
Uemura et al.

(10) Patent No.: US 11,069,277 B2
(45) Date of Patent: Jul. 20, 2021

(54) DISPLAY SYSTEM, MOBILE DEVICE AND WEARABLE DEVICE

(71) Applicant: CITIZEN WATCH CO., LTD., Tokyo (JP)

(72) Inventors: Ryutaro Uemura, Nishitokyo (JP);
Daisuke Matsuoh, Nishitokyo (JP);
Toshinori Okazaki, Nishitokyo (JP);
Shoya Kaneko, Higashimurayama (JP);
Ayaka Ohtake, Higashimurayama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/782,428

(22) Filed: Feb. 5, 2020

(65) Prior Publication Data
US 2020/0251037 A1 Aug. 6, 2020

(30) Foreign Application Priority Data

Feb. 6, 2019 (JP) .............................. JP2019-019417
Dec. 27, 2019 (JP) .............................. JP2019-238391

(51) Int. Cl.
*G09G 3/20* (2006.01)
*G06F 1/16* (2006.01)

(52) U.S. Cl.
CPC .............. *G09G 3/20* (2013.01); *G06F 1/163* (2013.01); *G09G 2356/00* (2013.01); *G09G 2360/04* (2013.01); *G09G 2370/06* (2013.01)

(58) Field of Classification Search
CPC .. G09G 3/20; G09G 2356/00; G09G 2360/04; G09G 2370/06; G06F 1/163
See application file for complete search history.

(56) References Cited

U.S. PATENT DOCUMENTS

| 9,808,670 B2* | 11/2017 | Hoffman | G16H 40/67 |
| 2007/0276576 A1 | 11/2007 | Inoue et al. | |
| 2012/0242571 A1 | 9/2012 | Takamura et al. | |

(Continued)

FOREIGN PATENT DOCUMENTS

| JP | 2003-130941 A | 5/2003 |
| JP | 2007-315807 A | 12/2007 |
| JP | 2010-257439 A | 11/2010 |

(Continued)

OTHER PUBLICATIONS

Communication drafted Oct. 22, 2020 by the Japanese Patent Office in application No. 2019-238391.

*Primary Examiner* — Kenneth B Lee, Jr.
(74) *Attorney, Agent, or Firm* — Sughrue Mion, PLLC

(57) ABSTRACT

A display system includes mobile devices each including a position detection unit that detects a position, a physical quantity detection unit that detects a physical quantity, a display unit that displays an image, and a process unit that can perform a process of controlling the display unit so that the image is displayed. The process unit can perform an overlapping display process in which the process unit controls the display unit so as to display a physical quantity image expressing the physical quantity detected by the physical quantity detection unit in a manner of overlapping on a travel route image expressing a travel route of the mobile device that is determined depending on the position detected by the position detection unit.

19 Claims, 16 Drawing Sheets

(56) References Cited

U.S. PATENT DOCUMENTS

2016/0049108 A1 2/2016 Yajima et al.
2019/0079463 A1* 3/2019 Hirota .................... G04G 21/00

FOREIGN PATENT DOCUMENTS

| JP | 2012-203485 A | 10/2012 |
| JP | 2013-44562 A | 3/2013 |
| JP | 2016-162329 A | 9/2016 |
| JP | 2018-9961 A | 1/2018 |
| JP | 2018-206167 A | 12/2018 |
| WO | 2014129212 A1 | 8/2014 |
| WO | 2017/159761 A1 | 9/2017 |

* cited by examiner

FIG.12

|  | SECOND MOBILE DEVICE | FIRST MOBILE DEVICE |
|---|---|---|
| 10:00 | WORN | MOVE |
| 10:05 | WORN | MOVE |
| 10:10 | WORN | MOVE |
| 10:15 | WORN | MOVE |
| 10:20 | NOT WORN | STOP |
| 10:25 | NOT WORN | STOP |
| 10:30 | NOT WORN | STOP |
| 10:35 | NOT WORN | STOP |
| 10:40 | NOT WORN | STOP |
| 10:45 | NOT WORN | STOP |
| 10:50 | NOT WORN | STOP |
| 10:55 | NOT WORN | MOVE |
| 11:00 | NOT WORN | MOVE |
| 11:05 | NOT WORN | MOVE |
| 11:10 | NOT WORN | MOVE |
| 11:15 | NOT WORN | MOVE |
| 11:20 | NOT WORN | MOVE |
| 11:25 | NOT WORN | MOVE |
| 11:30 | NOT WORN | MOVE |
| 11:35 | NOT WORN | MOVE |
| 11:40 | NOT WORN | MOVE |
| 11:45 | NOT WORN | MOVE |
| 11:50 | NOT WORN | MOVE |
| 11:55 | NOT WORN | MOVE |
| 12:00 | NOT WORN | MOVE |

DISPLAY SYSTEM, MOBILE DEVICE AND WEARABLE DEVICE

CROSS-REFERENCE TO RELATED APPLICATION(S)

The present application claims priority to and incorporates by reference the entire contents of Japanese Patent Application No. 2019-019417 filed in Japan on Feb. 6, 2019 and Japanese Patent Application No. 2019-238391 filed in Japan on Dec. 27, 2019.

BACKGROUND OF THE INVENTION

1. Field of the Invention

The present invention relates to a display system, a mobile device, and a wearable device.

2. Description of the Related Art

One example of the conventional display systems is a communication control system including an electronic watch and a computer as disclosed in WO2017/159761. In this communication control system, the computer receives from the electronic watch, balance information about transition of the power generation amount or the changing balance of a secondary battery of the electronic watch, and causes a display unit to display the transition of the balance information.

The aforementioned communication control system has room for improvement in point of displaying the physical quantity such as the power generation amount detected by a mobile device such as an electronic watch in association with the activity of a user who carries the mobile device so that the user can understand the information more easily.

SUMMARY OF THE INVENTION

The present invention has been made in view of the above circumstances, and an object is to provide a display system, a mobile device, and a wearable device that can display the detected physical quantity properly.

In order to achieve the above mentioned object, a display system according to one aspect of the present invention includes a mobile device including a position detection unit that detects a position, a physical quantity detection unit that detects a physical quantity, a display unit that displays an image, and a process unit that is able to perform a process of controlling the display unit so that the image is displayed, wherein the process unit is able to perform an overlapping display process in which the process unit controls the display unit so as to display a physical quantity image expressing the physical quantity detected by the physical quantity detection unit in a manner of overlapping on a travel route image expressing a travel route of the mobile device that is determined depending on the position detected by the position detection unit.

According to another aspect of the present invention, in the display system, it is possible to configure that, in the overlapping display process, the process unit performs display of the physical quantity image expressing the physical quantity detected by the physical quantity detection unit at a particular place in the travel route in a manner of overlapping on a position corresponding to the particular place in the travel route image.

According to still another aspect of the present invention, in the display system, it is possible to configure that the mobile device includes a first mobile device and a second mobile device capable of communicating with each other, the second mobile device includes the physical quantity detection unit and transmits detected physical quantity information about the physical quantity detected by the physical quantity detection unit to the first mobile device, and the first mobile device includes the position detection unit, the display unit, and the process unit and the process unit performs the overlapping display process by controlling the display unit on the basis of detected position information about the position detected by the position detection unit and the detected physical quantity information received from the second mobile device.

According to still another aspect of the present invention, in the display system, it is possible to configure that the second mobile device is a wearable device that a person is able to wear.

According to still another aspect of the present invention, in the display system, it is possible to configure that the second mobile device is an electronic watch that displays time with hands, and the physical quantity detected by the physical quantity detection unit is a power generation amount of power generated in the second mobile device.

According to still another aspect of the present invention, in the display system, it is possible to configure that the process unit is able to change a size of the physical quantity image in accordance with the physical quantity expressed by the physical quantity image in the overlapping display process.

According to still another aspect of the present invention, in the display system, it is possible to configure that, in the overlapping display process, when the physical quantity expressed by the physical quantity image is a relatively small value, the process unit makes a difference of a size of the physical quantity image with respect to a difference of the value of the physical quantity relatively large, and when the physical quantity expressed by the physical quantity image is a relatively large value, the process unit makes the difference of the size of the physical quantity image with respect to the difference of the value of the physical quantity relatively small.

According to still another aspect of the present invention, in the display system, it is possible to configure that the process unit is able to change a display color or a transmissivity of the physical quantity image in accordance with the physical quantity expressed by the physical quantity image in the overlapping display process.

According to still another aspect of the present invention, in the display system, it is possible to configure that the process unit restricts a maximum size and a minimum size of the physical quantity image within a predetermined ratio on the basis of a size of a display area of the display unit in the overlapping display process.

According to still another aspect of the present invention, in the display system, it is possible to configure that the process unit is able to perform the display of a plurality of the physical quantity images in an overlapping and distinguishable manner for each predetermined unit time in the overlapping display process.

According to still another aspect of the present invention, in the display system, it is possible to configure that the process unit performs sequential display of the physical quantities expressed by the physical quantity images in accordance with operation for the overlapping physical quantity images in the overlapping display process.

According to still another aspect of the present invention, in the display system, it is possible to configure that the process unit is able to change a method of aggregating the physical quantities to be displayed in the overlapping display process on the basis of travel speed of the mobile device.

According to still another aspect of the present invention, in the display system, it is possible to configure that when the travel speed of the mobile device is relatively low, the process unit aggregates the physical quantities in accordance with a travel distance of the mobile device, and when the travel speed of the mobile device is relatively high, the process unit aggregates the physical quantities in accordance with elapsed time.

According to still another aspect of the present invention, in the display system, it is possible to configure that when it is detected that the first mobile device and the second mobile device are separated from each other and moved relatively, the process unit performs an anti-lost process in a manner that the display of the physical quantity image in a period where the first mobile device and the second mobile device are separated from each other and moved relatively and the display of the physical quantity out of the period are made different in the overlapping display process.

According to still another aspect of the present invention, in the display system, it is possible to further include a server that is able to communicate with the mobile device and stores therein information to be transmitted to and received from the mobile device.

According to still another aspect of the present invention, in the display system, it is possible to configure that the process unit specifies a current particular place on a condition that a travel distance of the mobile device from a particular place in the travel route that is specified previously is over a determination distance that is set in advance and an elapsed time after the particular place is specified previously is over a determination period that is set in advance, and the process unit determines that a total value of the physical quantity detected by the physical quantity detection unit from the previously specified particular place to the currently specified particular place is the physical quantity at the particular place that is specified currently.

According to still another aspect of the present invention, in the display system, it is possible to configure that, in the overlapping display process, the process unit combines the physical quantities detected by the physical quantity detection unit at a plurality of particular places in the travel route in a combined display range determined in accordance with a combined display reference distance that is set in advance and performs display of the combined physical quantity as the one physical quantity image.

According to still another aspect of the present invention, in the display system, it is possible to configure that the process unit determines that an intermediate position between a first particular place corresponding to a start point in the combined display range, and a second particular place subsequent to the first particular place is an initial reference position, and performs a determination process for determining whether a distance between the reference position and the current particular place is equal to or more than the combined display reference distance, when it is determined that the distance between the reference position and the current particular place is not equal to or more than the combined display reference distance in the determination process, the process unit determines that the current particular place is the particular place in the combined display range and repeats the determination process after updating an intermediate position between the reference position and the current particular place to be the reference position in a next determination process, and when it is determined that the distance between the reference position and the current particular place is equal to or more than the combined display reference distance in the determination process, the process unit determines that the current particular place is the first particular place corresponding to the start point in the next combined display range.

In order to achieve the above mentioned object, a mobile device according to still another aspect of the present invention includes a position detection unit that detects a position; a physical quantity detection unit that detects a physical quantity; a display unit that displays an image; and a process unit that is able to perform a process of controlling the display unit so that the image is displayed, wherein the process unit is able to perform an overlapping display process in which the process unit controls the display unit so as to display a physical quantity image expressing the physical quantity detected by the physical quantity detection unit in a manner of overlapping on a travel route image expressing a travel route that is determined depending on the position detected by the position detection unit.

In order to achieve the above mentioned object, a wearable device according to still another aspect of the present invention includes a communication unit capable of communicating with a mobile device including a position detection unit that detects a position, a display unit that displays an image, and a process unit that is able to perform a process of controlling the display unit so that the image is displayed, the process unit being able to perform an overlapping display process in which the process unit controls the display unit so as to display a physical quantity image expressing a physical quantity in a manner of overlapping on a travel route image expressing a travel route that is determined depending on the position detected by the position detection unit; and a physical quantity detection unit that detects the physical quantity, wherein the communication unit transmits detected physical quantity information about the physical quantity detected by the physical quantity detection unit to the mobile device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a schematic diagram for describing one example of the anti-lost process in the display system according to the embodiment;

DETAILED DESCRIPTION OF THE PREFERRED EMBODIMENTS

An embodiment according to the present invention is hereinafter described in detail with reference to the drawings. Note that the present invention is not limited by the embodiment. The components in the embodiment below include the component that is easily replaced by a person skilled in the art and the component that is substantially the same.

Embodiment

Summary of Display System

Figure 1:
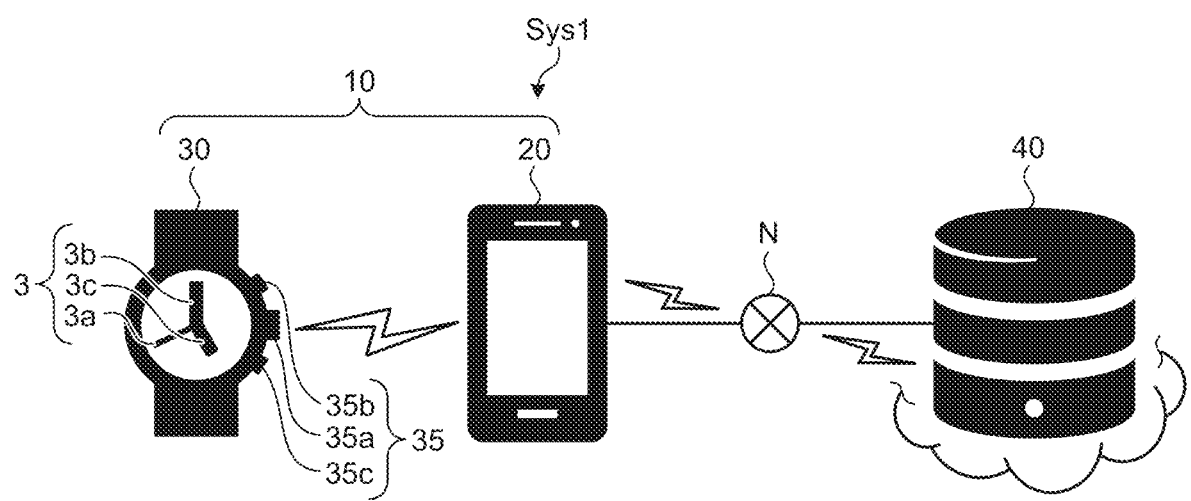
FIG. 1 is a block diagram illustrating a schematic structure of a display system according to an embodiment.

A display system Sys1 according to the present embodiment illustrated in FIG. 1 includes a mobile device 10 that a person can carry. The display system Sys1 according to the present embodiment is a system in which a display unit 25a of the mobile device 10 displays, in an overlapping manner, a travel route of the person who owns the mobile device 10 (hereinafter also referred to as "user") and the physical quantity detected by the mobile device 10. Thus, the display system Sys1 causes the display unit 25a to display the physical quantity detected by the mobile device 10 and the activity of the user who carries the mobile device 10 while associating these pieces of information with each other so that the user can understand the information easily.

One example of the display system Sys1 according to the present embodiment includes a plurality of mobile devices 10. Here, the mobile devices 10 include a first mobile device 20 and a second mobile device 30 that can communicate with each other. Moreover, the display system Sys1 according to the present embodiment includes, in addition to the mobile devices 10 (first mobile device 20, second mobile device 30), a server 40 that can communicate with the mobile devices 10. Since the first mobile device 20, the second mobile device 30, and the server 40 communicate with each other and work together, the display system Sys1 according to the present embodiment forms a cooperation system that can achieve the easy-to-understand display as described above. In the present embodiment, the physical quantity detected in the mobile device 10 is, for example, the power generation amount of the power generated in the second mobile device 30. Although the server 40 constitutes a part of the display system Sys1 here, the present invention is not limited to this structure and for example, the server 40 may be a server that constitutes a part of another system. Each structure of the display system Sys1 is described in detail with reference to each drawing.

Basic Structure of Mobile Device

The mobile device 10 is an electronic terminal device that the user can carry. Typically, the first mobile device 20 of the mobile devices 10 forms a main communication terminal that communicates with the server 40 through a network N. On the other hand, the second mobile device 30 of the mobile devices 10 forms a sub-communication terminal that communicates with the first mobile device 20 through near-field wireless communication. The network N is formed by an arbitrary communication network, either wireless communication using Wi-Fi (registered trademark), 4G, 5G, or the like, or wired communication using a communication line, and connects the server 40 and the first mobile device 20 so that the communication therebetween is possible. The type of the near-field wireless communication is, for example, Bluetooth (registered trademark), W-LAN, Wi-Fi (registered trademark), NFC (Near-Field Communication), or the like. However, the second mobile device 30 may be able to communicate with the server 40 and the first mobile device 20 through the network N instead of using the near-field wireless communication.

The mobile device 10 is, for example, a smartphone, a tablet PC, a laptop PC, a PDA, a mobile game machine, a wearable device that a person can wear, or the like. Examples of the wearable device include a wristband type, a spectacle type, a ring type, a shoe type, and a pendant type. In the example described in the present embodiment, the first mobile device 20 is a smartphone. On the other hand, the second mobile device 30 according to the present embodiment is a wristband type wearable device that a person can wear on his wrist, and in this example, the second mobile device 30 is an electronic watch (wristwatch) that displays time.

Basic Structure of First Mobile Device

The first mobile device 20 is an electronic terminal device that can receive various services from the server 40 by communicating with, and cooperating with the server 40. Here, the first mobile device 20 is a smartphone as described above.

Figure 2:
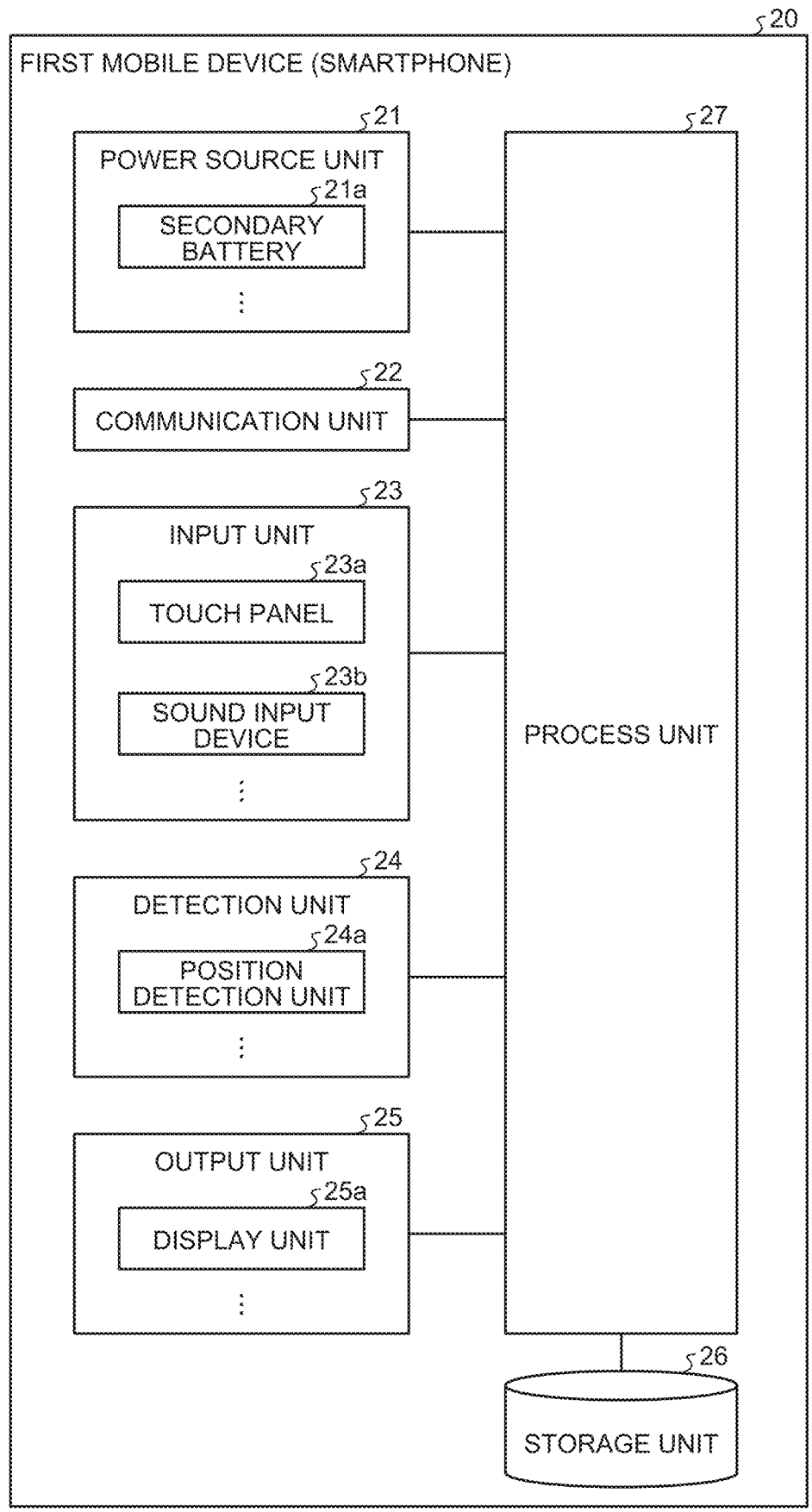
FIG. 2 is a block diagram illustrating a schematic structure of a first mobile device in the display system according to the embodiment.

Specifically, the first mobile device 20 includes a power source unit 21, a communication unit 22, an input unit 23, a detection unit 24, an output unit 25, a storage unit 26, and a process unit 27 as illustrated in FIG. 2.

The power source unit 21 is a power source for the first mobile device 20. The power source unit 21 includes a secondary battery 21a that is rechargeable and dischargeable, such as a lithium ion battery, and the like, and supplies the power to each part of the first mobile device 20.

The communication unit 22 is a communication module capable of communicating with the outside of the first mobile device 20. The communication unit 22 is connected to the network N with or without a wire so that communication is possible, and communicates with the server 40 through the network N. In addition, the communication unit 22 communicates with the second mobile device 30 through the near-field wireless communication.

The input unit 23 receives various inputs to the first mobile device 20. The input unit 23 includes, for example, a touch panel 23a that receives an operation input to the first mobile device 20 and a sound input device 23b that receives a sound input to the first mobile device 20. The input unit 23 may additionally include other input devices such as an operation button, a keyboard, and a mouse pointer.

The detection unit 24 detects various pieces of information in the first mobile device 20. The detection unit 24 includes at least a position detection unit 24a that detects the position in the first mobile device 20. The position detection unit 24a is a positioning unit that measures the current position of the first mobile device 20. The position detection unit 24a can use a GPS (Global Positioning System) receiver that receives electric waves transmitted from a GPS satellite, for example. The position detection unit 24a can detect the position in the first mobile device 20 by receiving the electric waves from the GPS satellite and acquiring the information (GPS information such as latitude and altitude coordinates) expressing the current position of the first mobile device 20. Additionally, the detection unit 24 may include, for example, an acceleration sensor that detects the acceleration that acts on the first mobile device 20, an illuminance sensor that detects the illuminance of the light delivered to the first mobile device 20, a temperature sensor that detects the temperature near the first mobile device 20, and a voltage/current sensor that detects the power source voltage, current, or the like of the power source unit 21, for example.

The output unit 25 performs various outputs from the first mobile device 20. The output unit 25 includes at least the display unit 25a that displays an image. The display unit 25a includes, for example, an image display device for displaying an image, such as a liquid crystal display, a plasma display, or an organic EL display. The aforementioned touch panel 23a is provided overlapping on a surface of this display unit 25a (see FIG. 4). The output unit 25 may also include a display light, a speaker/alarm buzzer, a vibrator, or the like.

The storage unit 26 is a storage unit such as a ROM, a RAM, or a semiconductor memory that is incorporated in the first mobile device 20. The storage unit 26 stores conditions and information that are necessary in various processes in the first mobile device 20, various application computer programs to be executed in the first mobile device 20, control data, and the like therein. The storage unit 26 can store various pieces of information received by the communication unit 22, various pieces of information input by the input unit 23, various pieces of information detected by the detection unit 24 (for example, including detected position information about the position detected by the position detection unit 24a), various pieces of information output by the output unit 25, and the like therein. The information in the storage unit 26 is read out by the process unit 27 or the like as necessary.

The process unit 27 is electrically connected to each part of the first mobile device 20 and generally controls each part of the first mobile device 20. The process unit 27 includes an electronic circuit mainly including a known microcomputer including a central processing device such as a CPU. The process unit 27 is connected to each part of the first mobile device 20 so that communication therebetween is possible, and can exchange various signals with each unit. The process unit 27 executes various application computer programs stored in the storage unit 26, and by the operation of the computer programs, executes various processes so as to operate each part of the first mobile device 20 and achieve various functions. The process unit 27 can perform a process of controlling at least the display unit 25a so that an image is displayed. In addition, the process unit 27 can perform the process of acquiring various pieces of information through the communication unit 22 from the second mobile device 30, the server 40, or the like and storing the information in the storage unit 26. Moreover, for example, the process unit 27 performs various processes in accordance with the operation content that the user has performed with the input unit 23 (touch panel 23a, sound input device 23b).

Basic Structure of Second Mobile Device

The second mobile device 30 is an electronic terminal device that can receive various services together with the first mobile device 20 by communicating with, and cooperating with the first mobile device 20. Here, the second mobile device 30 is an electronic watch as described above. The second mobile device 30 according to the present embodiment is paired with the first mobile device 20 through various pairing operations so that the communication therebetween is possible. The second mobile device 30 illustrated in FIG. 1 is an analog electronic watch (analog quartz watch) displaying time in a manner that physical hands 3 (second hand 3a, minute hand 3b, hour hand 3c) indicate indices (numerals) on a dial plate. Note that the second mobile device 30 is not limited to this watch and may be a digital electronic watch (digital quartz watch) that displays time digitally, a combination electronic watch (combination quartz watch) including a digital display on an analog hand display, or the like.

Figure 3:
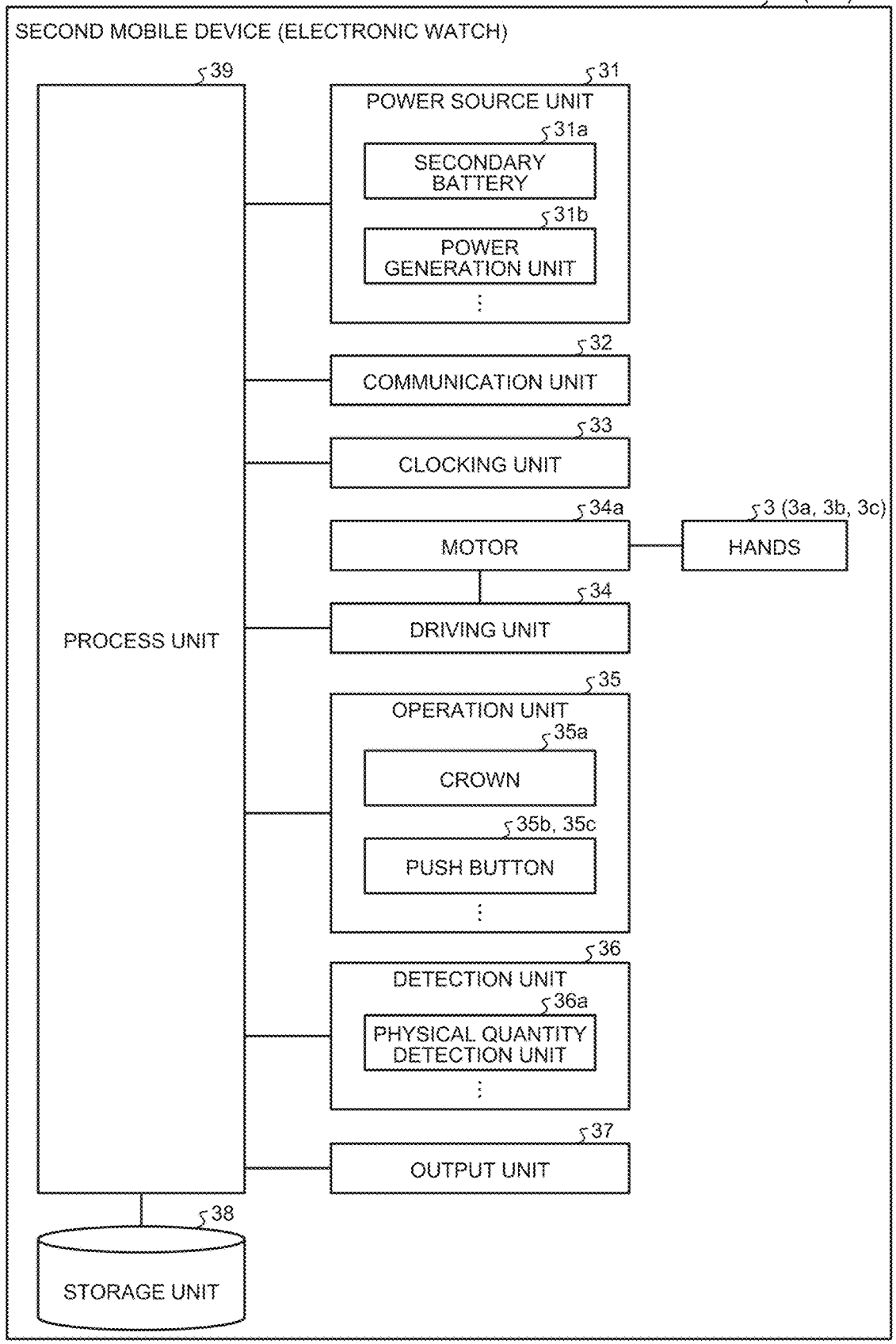
FIG. 3 is a block diagram illustrating a schematic structure of a second mobile device in the display system according to the embodiment.

Specifically, the second mobile device 30 includes a power source unit 31, a communication unit 32, a clocking unit 33, a driving unit 34, an operation unit 35, a detection unit 36, an output unit 37, a storage unit 38, and a process unit 39 as illustrated in FIG. 3.

The power source unit 31 is a power source for the second mobile device 30. The power source unit 31 includes a secondary battery 31a that is rechargeable and dischargeable, such as a lithium ion battery, and a power generation unit 31b that can generate electric power, and supplies the power to each part of the second mobile device 30. The power generation unit 31b is formed by a power generation element such as a solar cell that can generate electric power by converting photo energy into electric energy using a photovoltaic effect. Note that the power generation unit 31b may alternatively be formed by a piezoelectric element, a thermoelectric conversion element, a vibration power generation element, or the like.

The communication unit 32 is a communication module capable of communicating with the outside of the second mobile device 30. The communication unit 32 communicates with the first mobile device 20 through the near-field wireless communication. The communication unit 22 may be connected to the network N with or without a wire so that communication is possible, and communicate with the server 40 and the first mobile device 20 through the network N.

The clocking unit 33 is a circuit that clocks the time (time in the watch) to be expressed by the hands 3. The clocking unit 33 includes, for example, an oscillator, an oscillation circuit, a compensation circuit, a frequency dividing circuit, and the like. The clocking unit 33 clocks the time by generating a clock signal with a predetermined frequency, based on which the time is clocked inside the second mobile device 30, and counting the pulses in the clock signal.

The driving unit 34 is a circuit that drives to turn the hands 3. The driving unit 34 operates a motor (for example, stepping motor) 34a with the electric power supplied from the power source unit 31. The turning power generated by the motor 34a is transmitted to the hands 3 through wheels or the like, and thus the hands 3 are driven to turn. The motor 34a may be provided for each of the hands 3 (second hand 3a, minute hand 3b, hour hand 3c) individually, or may be common to some hands 3.

The operation unit 35 receives the external operation as various inputs to the second mobile device 30. The operation unit 35 is formed by a crown 35a provided to protrude from an outer peripheral surface of an exterior case, push buttons 35b and 35c, and the like (also see FIG. 1). The operation unit 35 receives various operations in a manner that parts in the exterior case work together as the crown 35a is pulled and turned, or the push button 35b or 35c is pushed. The operation unit 35 may additionally include a register ring, for example.

The detection unit 36 detects various pieces of information in the second mobile device 30. The detection unit 36 includes at least a physical quantity detection unit 36a that detects various kinds of physical quantities in the second mobile device 30. In the present embodiment, the physical quantity detected by the physical quantity detection unit 36a is the power generation amount of the electric power generated in the second mobile device 30 as described above. Here, the physical quantity detection unit 36a is formed by a voltage/current sensor or the like for detecting the power generation amount of the power generation unit 31b by detecting the power source voltage or the current in the secondary battery 31a, the presence or absence of the power generation in the power generation unit 31b, the power generation voltage, current, or the like as the physical quantity that can be detected in the second mobile device 30. The detection unit 36 may additionally include, for example, an acceleration sensor that detects the acceleration that acts on the second mobile device 30, an illuminance sensor that detects the illuminance of the light delivered to the second mobile device 30, a temperature sensor that detects the temperature near the second mobile device 30, and a positioning unit that measures the current position of the second mobile device 30.

The output unit 37 outputs various pieces of information other than the time from the second mobile device 30. The output unit 37 may include, for example, a display light, a speaker/alarm buzzer, a vibrator, or the like. Note that if the second mobile device 30 is a digital electronic watch or a combination electronic watch, the output unit 37 may include a display that displays an image including time and function selection digitally instead of the physical hands 3.

The storage unit 38 is a storage device such as a ROM, a RAM, or a semiconductor memory that is incorporated in the second mobile device 30. Typically, the storage unit 38 has smaller storage capacity than the storage unit 26 in the first mobile device 20 described above. The storage unit 38 stores conditions and information that are necessary in various processes in the second mobile device 30, various application computer programs to be executed in the first mobile device 20, control data, and the like therein. The storage unit 38 can also store various pieces of information received by the communication unit 32, various pieces of time information clocked by the clocking unit 33, various pieces of information detected by the detection unit 36 (for example, including detected physical quantity information about the physical quantity detected by the physical quantity detection unit 36a), various pieces of information output by the output unit 37, and the like therein. The information in the storage unit 38 is read out by the process unit 39 or the like as necessary.

The process unit 39 is electrically connected to each part of the second mobile device 30 and generally controls each part of the second mobile device 30. The process unit 39 includes an electronic circuit mainly including a known microcomputer including a central processing device such as a CPU. The process unit 39 is connected to each part of the second mobile device 30 so that communication therebetween is possible, and can exchange various signals with each unit. The process unit 39 executes various application computer programs stored in the storage unit 38, and by the operation of the computer programs, executes various processes so as to operate each part of the second mobile device 30 and achieve various functions. For example, the process unit 39 performs a process of controlling the motor 34a by the driving unit 34 on the basis of the time clocked by the clocking unit 33, turning the hands 3 to advance, and displaying the clocked time by the hands 3 as the current time. Furthermore, the process unit 39 performs various processes in accordance with the operation content the user has performed with the operation unit 35 (crown 35a, push buttons 35b, 35c).

Basic Structure of Server

The server 40 forms a cloud service device (cloud server) that is implemented on the network N. The server 40 includes an electronic circuit mainly including a known microcomputer including a central processing device such as a CPU, a semiconductor memory, and other various storage devices. The server 40 can be formed by installing computer programs to achieve various processes in a known PC or a computer system such as a workstation. In addition, the server 40 may be either a single device or a combination of a plurality of devices capable of mutual communication. The server 40 stores and manages information to be exchanged with the mobile device 10 (here, the first mobile device 20). Furthermore, the server 40 stores and manages various pieces of information that are necessary in various services in the display system Sys1. The information in the server 40 is read out as necessary through the network N or the like.

Summary of Overlapping Display Process

Figure 4:
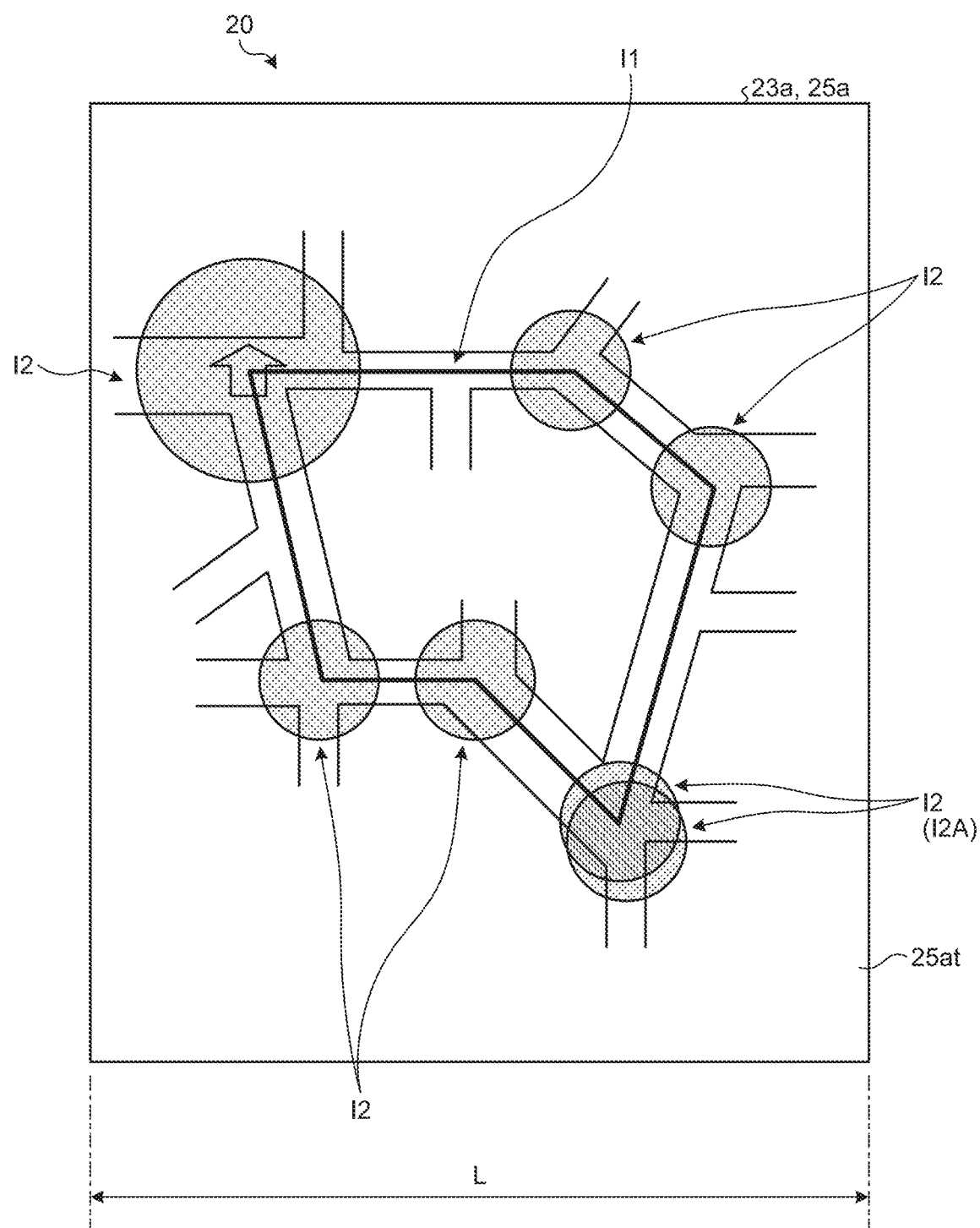
FIG. 4 is a diagram illustrating one example of a display screen displayed on a display unit of the display system according to the embodiment.

In the display system Sys1 with the aforementioned structure, the process unit 27 in the first mobile device 20 can perform an overlapping display process by controlling the display unit 25a. The overlapping display process is a process in which a physical quantity image I2 is displayed in a manner of overlapping on a travel route image I1 by controlling the display unit 25a as illustrated in FIG. 4. The travel route image I1 that is displayed in the overlapping display process is an image expressing the travel route of the mobile device 10 that is determined depending on the position of the mobile device 10 that is detected by the position detection unit 24a of the mobile device 10, and is displayed including a map image or the like, for example. The travel route of the mobile device 10 corresponds to the travel route of the user who carries the mobile device 10. That is to say, the travel route image I1 corresponds to the image that expresses the travel route of the user who carries the mobile device 10. On the other hand, the physical quantity image I2 that is displayed in the overlapping display process is an image expressing the physical quantity that is detected by the physical quantity detection unit 36a of the mobile device 10. Here, the physical quantity detected by the physical quantity detection unit 36a is the power generation amount of the electric power generated in the second mobile device 30 as described above. That is to say, the physical quantity image I2 corresponds to the image that expresses the power generation amount of the electric power generated in the second mobile device 30 as the physical quantity that is detected by the physical quantity detection unit 36a. The display system Sys1, by performing this overlapping display process in the process unit 27, achieves the easy-to-understand display in which the physical quantity detected by the mobile device 10, here the power generation amount in the second mobile device 30, and the activity of the user who carries the mobile device 10 are associated with each other.

Here, the position detection unit 24a, the display unit 25a, the process unit 27 that performs the overlapping display process are provided to the first mobile device 20 of the mobile devices 10 and the physical quantity detection unit 36a is provided to the second mobile device 30 of the mobile devices 10 as described above. The second mobile device 30 transmits, to the first mobile device 20, the detected physical quantity information about the physical quantity (power generation amount) detected by the physical quantity detection unit 36a. Then, in the first mobile device 20, the process unit 27 controls the display unit 25a so as to perform the overlapping display process on the basis of the detected position information about the position detected by the position detection unit 24a and the detected physical quantity information received from the second mobile device 30. The process unit 27 in the first mobile device 20 according to the present embodiment performs the overlapping display process in cooperation with the server 40, for example. Here, the process unit 27 causes the server 40 to store the detected physical quantity information received from the second mobile device 30 once therein, and then reads out the detected physical quantity information and necessary information from the server 40 as necessary and thus, performs the overlapping display process.

One Example of Procedure

Figure 5:
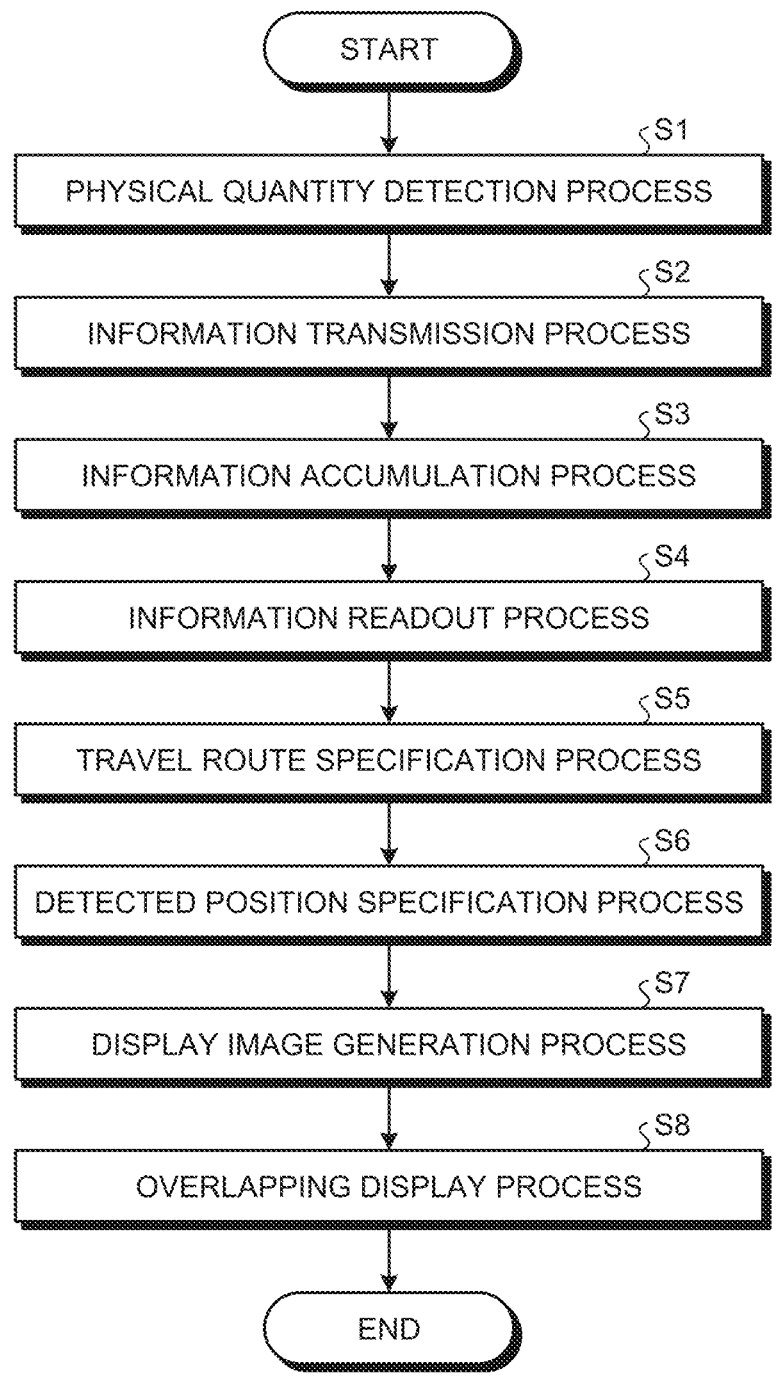
FIG. 5 is a flowchart illustrating one example of a series of steps performed in an overlapping display process in the display system according to the embodiment.

The display system Sys1 according to the present embodiment achieves the display as illustrated in FIG. 4 by performing the following process as illustrated in FIG. 5: a physical quantity detection process (step S1), an information transmission process (step S2), an information accumulation process (step S3), an information readout process (step S4), a travel route specification process (step S5), a detected position specification process (step S6), a display image generation process (step S7), and an overlapping display process (step S8). The process units 27 and 39 perform each of the above steps by executing the computer programs stored in the storage units 26 and 38. As the computer programs are executed by the process units 27 and 39, the mobile devices 10 (first mobile device 20, second mobile device 30) as the computer perform the above steps.

Physical Quantity Detection Process

First, the process unit 39 of the second mobile device 30 performs the physical quantity detection process (step S1). The physical quantity detection process is a process of detecting the physical quantity by the physical quantity detection unit 36a at a predetermined sampling period (for example, five minutes). Here, the physical quantity detection unit 36a detects the power generation amount of the electric power generated in the power generation unit 31b of the second mobile device 30 as the physical quantity.

Information Transmission Process

Next, the process unit 39 performs the information transmission process through the communication unit 32 (step S2). The information transmission process is a process of transmitting the detected physical quantity information about the physical quantity detected in the physical quantity detection process to the first mobile device 20 through the communication unit 32. The process unit 39 performs the information transmission process about the unsent detected physical quantity information at a timing when the near-field wireless communication between the first mobile device 20 and the second mobile device 30 through the communication units 22 and 32 has become possible.

Information Accumulation Process

Next, the process unit 27 of the first mobile device 20 having received the detected physical quantity information from the second mobile device 30 through the communication unit 22 performs the information accumulation process through the communication unit 22 (step S3). The information accumulation process is a process of transmitting the detected physical quantity information received from the second mobile device 30 to the server 40 through the communication unit 22 together with other information. In the information accumulation process, the process unit 27 transmits the detected physical quantity information received from the second mobile device 30 together with the detected position information about the position detected by the position detection unit 24a to the server 40. In this case, the process unit 27 associates (links) the detected physical quantity information, the detected time information expressing the time when the physical quantity in the detected physical quantity information has been detected, and the detected position information expressing the position where the physical quantity in the detected physical quantity information has been detected, stores these pieces of information in the server, and accumulates the information therein.

Information Readout Process

Next, the process unit 27 performs the information readout process through the communication unit 22 (step S4). The information readout process is a process of reading out the detected physical quantity information, the detected time information, and the detected position information that are associated with each other from the server 40 through the communication unit 22. In this case, the process unit 27 reads out all the combinations of the detected physical quantity information, the detected time information, and the detected position information in a target period for performing the overlapping display process from the server 40, for example. The target period for performing the overlapping display process may be determined in advance, or may be set arbitrarily by a user through the input unit 23 or the like.

Travel Route Specification Process Next, the process unit 27 performs the travel route specification process (step S5). The travel route specification process is a process of specifying a travel route (travel trajectory) of the mobile device 10 (first mobile device 20, second mobile device 30) on the basis of the detected time information and the detected position information in the target period read out from the server 40. The travel route of the mobile device 10 specified in the travel route specification process corresponds to a travel route of the user who carries the mobile device 10.

Detected Position Specification Process

Next, the process unit 27 performs the detected position specification process (step S6). The detected position specification process is a process of specifying the position where the physical quantity of each piece of the detected physical quantity information has been detected in the travel route specified in the travel route specification process on the basis of the detected physical quantity information, the detected time information, and the detected position information in the target period read out from the server 40.

Display Image Generation Process

Next, the process unit 27 performs a display image generation process (step S7). The display image generation process is a process of generating a display image that is displayed on the display unit 25a on the basis of the travel route specified in the travel route specification process, and the position where the physical quantity of each piece of the detected physical quantity information specified in the detected position specification process has been detected. In the display image generation process, the process unit 27 generates a display image (see FIG. 4) where the physical quantity image I2 expressing the physical quantity of each piece of the detected physical quantity information is overlapped on the travel route image I1 expressing the travel route specified in the travel route specification process. In this case, the process unit 27 overlaps the physical quantity image I2 expressing the physical quantity of each piece of the detected physical quantity information at the position corresponding to the position where each physical quantity has been detected in the travel route image I1. That is to say, the process unit 27 generates the display image where the physical quantity image I2 expressing the physical quantity detected by the physical quantity detection unit 36a at a particular place in the travel route is overlapped on the position corresponding to the particular place in the travel route image I1.

Overlapping Display Process

Then, the process unit 27 performs the overlapping display process by controlling the display unit 25a on the basis of the display image generated in the display image generation process (step S8) and ends a series of process. In the overlapping display process, the process unit 27 causes the display unit 25a to display the display image generated in the display image generation process; thus, each physical quantity image I2 is displayed overlapping on the travel route image I1 as illustrated in FIG. 4. More specifically, in the overlapping display process, the process unit 27 causes the display unit 25a to display the physical quantity image I2 expressing the physical quantity detected at the particular place in the travel route in a manner of overlapping at the position corresponding to the particular place in the travel route image I1.

Variation of Physical Quantity Image

In the overlapping display process as described above, the physical quantity image I2 can be displayed on the display unit 25a in various display modes. Typically, in the overlapping display process, the process unit 27 can change the display mode of the physical quantity image I2 in accordance with the magnitude of the physical quantity expressed by the physical quantity image I2.

Variation 1: Size Change

In the overlapping display process, the process unit 27 can change the size of the physical quantity image I2 in accordance with the magnitude of the physical quantity expressed by the physical quantity image I2 as illustrated in FIG. 4. For example, as illustrated in FIG. 4, if the physical quantity image I2 is circular, the process unit 27 can change the size of the physical quantity image I2 by changing the diameter of the circle (i.e., area of circle). In this case, if the physical quantity expressed by the physical quantity image I2 is a relatively small value, the process unit 27 makes the size of the physical quantity image I2 relatively small and the small image is displayed on the display unit 25a. On the other hand, if the physical quantity expressed by the physical quantity image I2 is a relatively large value, the process unit 27 makes the size of the physical quantity image I2 relatively large and the large image is displayed on the display unit 25a. That is to say, in this case, the display system Sys1 causes the display unit 25a to display the physical quantity image I2 that has been made relatively small; thus, it is possible to express that the power generation amount (physical quantity) of the second mobile device 30 at the position where the physical quantity image I2 is displayed is relatively small. On the other hand, the display system Sys1 causes the display unit 25a to display the physical quantity image I2 that has been made relatively large; thus, it is possible to express that the power generation amount (physical quantity) of the second mobile device 30 at the position where the physical quantity image I2 is displayed is relatively large.

Additional Note 1 about Size Change: Size Change Degree

In addition, in this case, in the overlapping display process, if the physical quantity expressed by the physical quantity image I2 is the relatively small value, the process unit 27 may make the difference of the physical quantity image I2 with respect to the difference of the value of the physical quantity relatively large and cause the display unit 25a to display the physical quantity image I2. Then, if the physical quantity expressed by the physical quantity image I2 is the relatively large value, the process unit 27 may make the difference of the physical quantity image I2 with respect to the difference of the value of the physical quantity relatively small and cause the display unit 25a to display the physical quantity image I2. Thus, the display system Sys1 can express the difference in magnitude of the physical quantity expressed by the physical quantity image I2 effectively in the form of the size of the physical quantity image I2.

Additional Note 2 about Size Change: Size Restriction In the overlapping display process, the process unit 27 may restrict the maximum size and the minimum size of the physical quantity image I2 within a predetermined ratio on the basis of the size of a display area 25at (see FIG. 4) in the display unit 25a. Here, the display area 25at in the display unit 25a is an area where the image can be displayed on the display unit 25a and is an approximately rectangular area in the example illustrated in FIG. 4. The process unit 27 may restrict the maximum size of the physical quantity image I2 to the size within the display area 25at, for example, the diameter that is equal to or less than a half of the length L (see FIG. 4) of the display area 25at in a short-side direction. In this case, even if the physical quantity expressed by the physical quantity image I2 is over the value corresponding to the maximum size, the process unit 27 causes the display unit 25a to display the physical quantity image I2 with the maximum size that has been restricted as above. In addition, the process unit 27 may restrict the minimum size of the physical quantity image I2 to be the size that is easy for the user to see, for example, the diameter that is ½₀ or more of the length L (see FIG. 4) of the display area 25at in the short-side direction. In this case, even if the physical quantity expressed by the physical quantity image I2 is below the value corresponding to the minimum size, the process unit 27 causes the display unit 25a to display the physical quantity image I2 with the minimum size that has been restricted as above. In addition, the process unit 27 may restrict the maximum size and the minimum size of the physical quantity image I2 similarly when the entire display screen including the physical quantity image I2 is magnified/reduced as the user performs a magnifying/reducing operation (pinch-out/in operation) on the touch panel 23a. Thus, the display system Sys1 can make it easy for the user to see the display on the display unit 25a in the overlapping display process.

Variation 2: Color Parameter Change

In the overlapping display process, the process unit 27 can change the display color or the transmissivity of the physical quantity image I2 in accordance with the magnitude of the physical quantity expressed by the physical quantity image I2. The process unit 27 can change the display color of the physical quantity image I2 by changing the hue, saturation, and lightness, which are the three attributes of color. Here, the hue is the attribute expressing the kind of colors, meaning the difference in color phase like red, yellow, green, blue, or purple. The saturation expresses the intensity of the color. The lightness expresses the brightness of the color. The transmissivity of the physical quantity image I2 is the index expressing the degree of making an image behind the physical quantity image I2 visible. A small value means the image behind the physical quantity image I2 being less visible, and a large value means the image behind the physical quantity image I2 being more visible.

Figure 6:
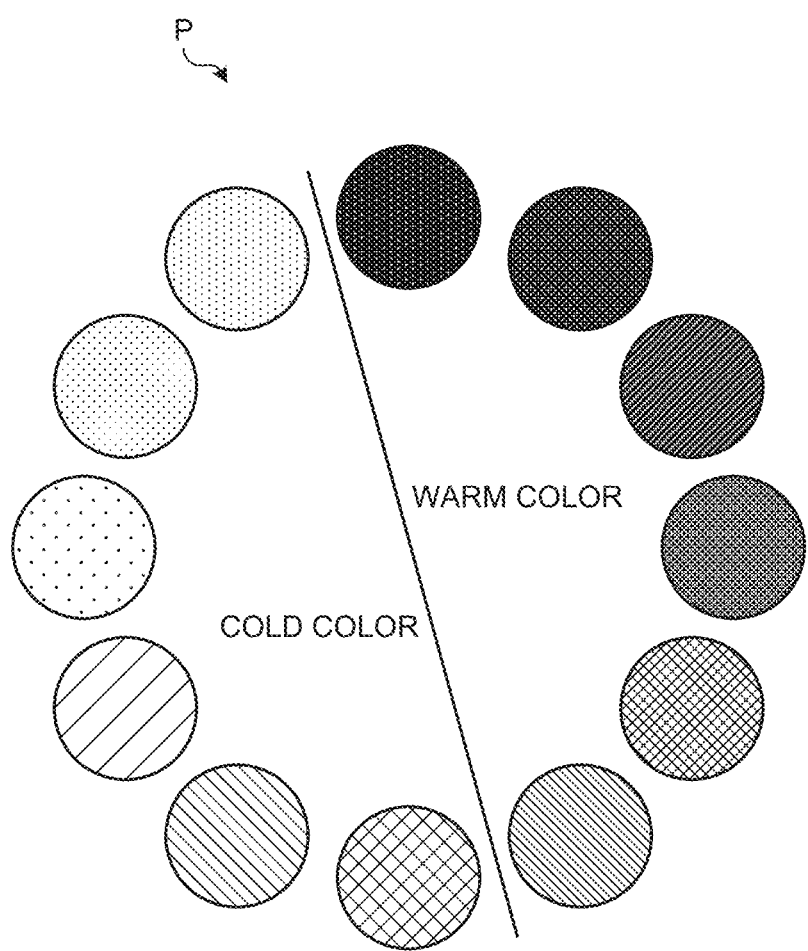
FIG. 6 is a diagram illustrating one example of display colors of physical quantity images displayed on the display unit of the display system according to the embodiment.

The process unit 27 can change the display color of the physical quantity image I2 in accordance with the magnitude of the physical quantity expressed by the physical quantity image I2 on the basis of color pallet data P (stored in the storage unit 26) that is illustrated in FIG. 6, for example. The pallet data P is the data about a plurality of display colors of the physical quantity image I2 and is stored in the storage unit 26. In this case, for example, if the physical quantity expressed by the physical quantity image I2 is a relatively small value, the process unit 27 causes the display unit 25a to display the physical quantity image I2 in a cold display color. On the other hand, if the physical quantity expressed by the physical quantity image I2 is a relatively large value, the process unit 27 causes the display unit 25a to display the physical quantity image I2 in a warm display color. That is to say, in this case, the display system Sys1 can express that the power generation amount (physical quantity) of the second mobile device 30 at the position where the physical quantity image I2 is displayed is relatively small by causing the display unit 25a to display the physical quantity image I2 in the cold display color. On the other hand, the display system Sys1 can express that the power generation amount (physical quantity) of the second mobile device 30 at the position where the physical quantity image I2 is displayed is relatively large by causing the display unit 25a to display the physical quantity image I2 in the warm display color. Similarly, if the physical quantity expressed by the physical quantity image I2 is the relatively small value, the process unit 27 may cause the display unit 25a to display the physical quantity image I2 with the high transmissivity. On the other hand, if the physical quantity expressed by the physical quantity image I2 is the relatively large value, the process unit 27 may cause the display unit 25a to display the physical quantity image I2 with the low transmissivity.

Overlapping Display of Physical Quantity Image

Figure 7:
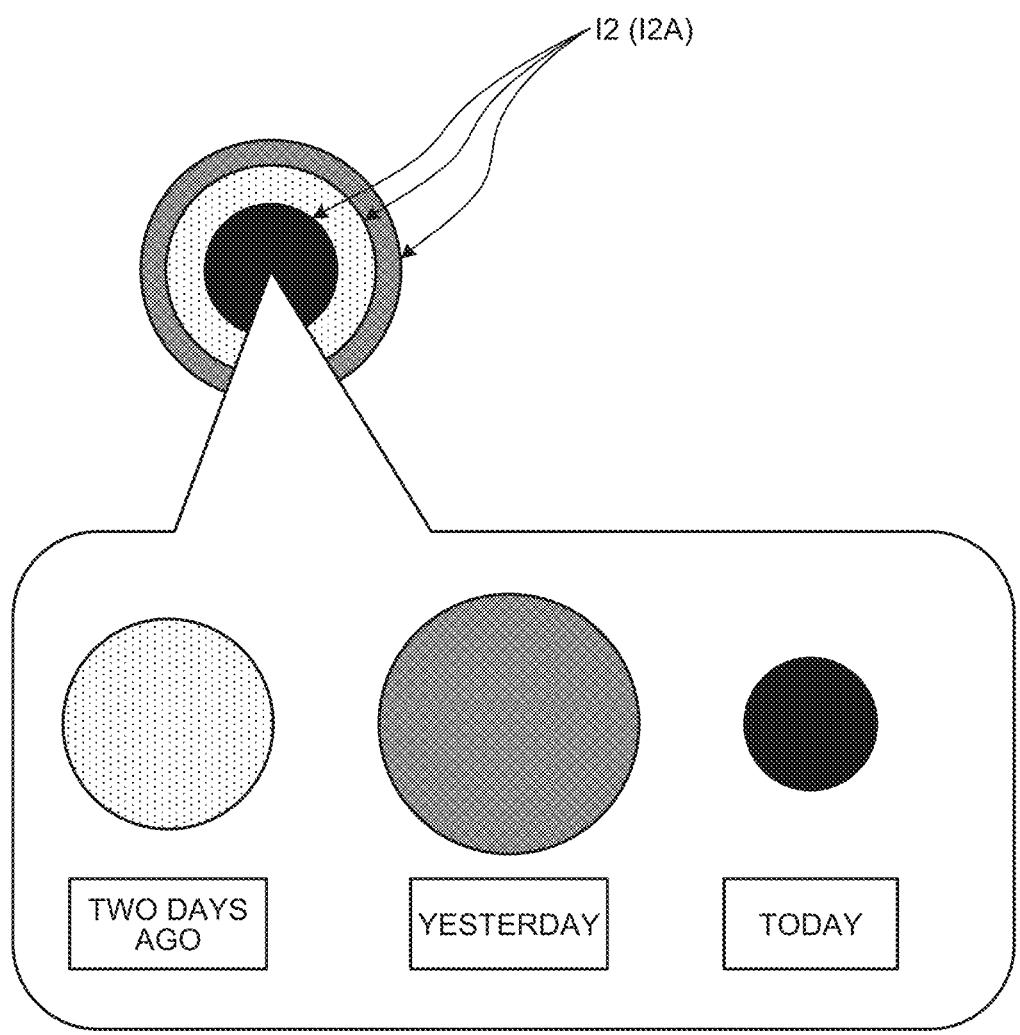
FIG. 7 is a diagram illustrating one example of the overlapping display of the physical quantity images displayed on the display unit of the display system according to the embodiment.

In the overlapping display process, the process unit 27 can perform the display of the physical quantity images I2 in an overlapping and distinguishable manner for each predetermined unit time (see physical quantity image I2A in FIG. 4, FIG. 7). Here, the predetermined unit time may be determined in advance in accordance with the sampling period of the physical quantity by the physical quantity detection unit 36a or the like, or may be set arbitrarily by the user through the input unit 23, for example. In the case where the physical quantity images I2 are displayed in the overlapping manner, for example, the process unit 27 may cause the display unit 25a to display the physical quantity images I2 in the distinguishable manner by changing the display color or the transmissivity between the physical quantity images I2. In this case, for example, as illustrated in FIG. 7, the process unit 27 may cause the display unit 25a to display the latest physical quantity image I2 with the relatively dense color and display the older physical quantity image I2 from the current time with the thinner color. In addition, as illustrated in the example in FIG. 7, in the overlapping display process, the process unit 27 may cause the display unit 25a to display the details of the physical quantity expressed by each of the physical quantity images I2 with a balloon in accordance with the selecting operation (tapping operation) on the overlapping physical quantity images I2 through the input unit 23 or the like. Furthermore, in the overlapping display process, the process unit 27 may cause the display unit 25a to display the physical quantities expressed by the physical quantity images I2 sequentially in accordance with the selecting operation (tapping operation) on the overlapping physical quantity images I2 through the input unit 23 or the like.

Method of Aggregating Physical Quantities

The process unit 27 can change the method of aggregating the physical quantities to be displayed in the overlapping display process (step S8) in a later step on the basis of the travel speed of the mobile device 10 in the aforementioned detected position specification process (step S6). Thus, the display system Sys1 can properly aggregate the physical quantities in accordance with the situation. Here, the process unit 27 can aggregate the physical quantities at each point (corresponding to each particular place in the travel route described above) using a first aggregating method and a second aggregating method described below for different cases on the basis of the travel speed of the mobile device 10.

First Aggregating Method

The first aggregating method is an aggregating method based on the travel distance of the mobile device 10. The process unit 27 aggregates the physical quantities in accordance with the travel distance of the mobile device 10 in the first aggregating method. In the first aggregating method, the process unit 27 specifies a travel point (corresponding to each particular place in the travel route described above) for every predetermined travel distance (for example, 300 m) on the basis of the position detected by the position detection unit 24a. This process corresponds to a process of sectioning each particular place in the travel route for each predetermined distance (for example, 300 m). Then, the process unit 27 aggregates the physical quantities (power generation amount) detected by the physical quantity detection unit 36a in a period for which the travel to each travel point is performed, adds up the values, and obtains the physical quantity at the respective travel points. For example, in the case where the user with the mobile device 10 has moved from a point A to a position 300 m away, the process unit 27 determines that the user has moved from the point A to a point B. Then, the process unit 27 aggregates and adds up the power generation amount (physical quantity) detected by the physical quantity detection unit 36*a* while the user has moved from the point A to the point B, and obtains the addition result as the power generation amount at the point A. Next, in the case where the user with the mobile device 10 has moved from the point B to a position 300 m away, the process unit 27 determines that the user has moved from the point B to a point C. Then, the process unit 27 aggregates and adds up the power generation amount (physical quantity) detected by the physical quantity detection unit 36*a* while the user has moved from the point B to the point C, and obtains the addition result as the power generation amount at the point B. This applies similarly to the description below.

Figure 8:
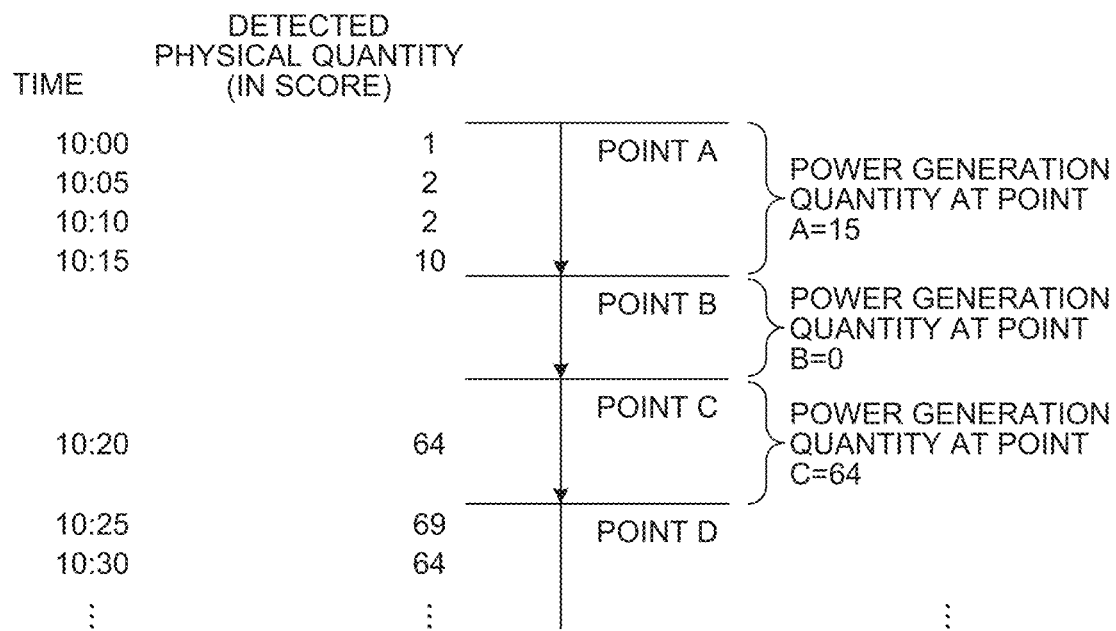
FIG. 8 is a schematic diagram for describing one example of a first aggregating method for physical quantities in the display system according to the embodiment.
Figure 9:
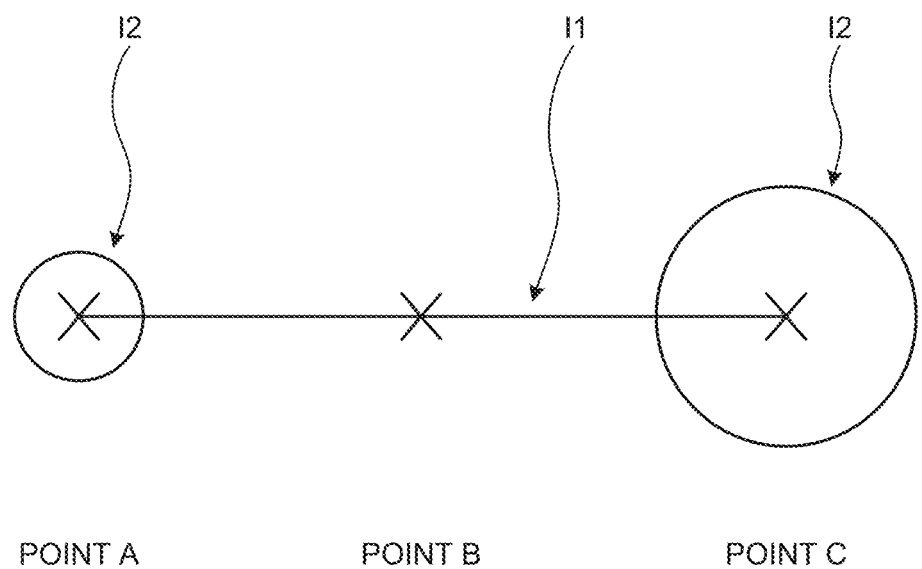
FIG. 9 is a schematic diagram for describing one example of the physical quantity images expressing the physical quantities aggregated by the first aggregating method for the physical quantities in the display system according to the embodiment.

FIG. 8 illustrates one example of the first aggregating method in a case where the period for sampling the physical quantity is five minutes, and here, the power generation amount is expressed as a value that has been converted into a score. For example, in the case where the user with the mobile device 10 has moved from the point A to the point B that is 300 m away from the point A between 10:00 and 10:15, the process unit 27 calculates the total of the power generation amount detected between 10:00 and 10:15 when the user has moved from the point A to the point B. Then, the process unit 27 obtains the total value=15 of the power generation amount detected between 10:00 and 10:15 as the power generation amount at the point A. In the case where the user has moved from the point B to the point C that is 300 m away from the point B after 10:15 and before the next sampling period starts (10:20), the process unit 27 does not detect the power generation amount in the period for which the user has moved from the point B to the point C; therefore, the power generation amount at the point B is zero. Then, in the case where the user has moved from the point C to a point D that is 300 m away from the point C before 10:25, the process unit 27 calculates the total of the power generation amount detected before 10:25 when the user has moved from the point C to the point D. Then, the process unit 27 obtains the total value=64 of the power generation amount detected before 10:25 as the power generation amount at the point C. As a result, the physical quantity images I2 displayed on the display unit 25*a* in the overlapping display process are in the magnitude relation as illustrated in FIG. 9. In this case, the physical quantity image I2 at the point C is displayed larger than the physical quantity image I2 at the point A and the physical quantity image I2 is not displayed at the point B where the power generation amount is zero.

Second Aggregating Method The second aggregating method is an aggregating method based on an elapsed time. The process unit 27 aggregates the physical quantities in accordance with the elapsed time in the second aggregating method. In the second aggregating method, the process unit 27 aggregates the physical quantities for every predetermined elapsed time, for example. In this case, the process unit 27 specifies the point where a predetermined time has elapsed as a point where the physical quantities are aggregated (corresponding to each particular place in the travel route described above) on the basis of the position detected by the position detection unit 24*a*, for example. This process corresponds to a process of sectioning each particular place in the travel route for each predetermined elapsed time.

Then, the process unit 27 aggregates the physical quantities (power generation amount) detected by the physical quantity detection unit 36*a* in the predetermined elapsed period, adds up the values, and obtains the physical quantity at the respective points.

One example of using aggregating methods for different cases is described. For example, in a case where the travel speed of the mobile device 10 is relatively low, the process unit 27 may aggregate the physical quantities in the first aggregating method and in a case where the travel speed of the mobile device 10 is relatively high, the process unit 27 may aggregate the physical quantities in the second aggregating method. That is to say, in the case where the travel speed of the mobile device 10 is relatively low, the process unit 27 may aggregate the physical quantities in accordance with the travel distance of the mobile device 10 and in the case where the travel speed of the mobile device 10 is relatively high, the process unit 27 may aggregate the physical quantities in accordance with the elapsed time. In this case, the display system Sys1 employs the first aggregating method when the travel speed of the mobile device 10 is low; thus, for example, when the user stays at substantially the same place, the specification of the aggregating point and the aggregation of the physical quantities at the substantially the same point will not be performed continuously. On the other hand, when the travel speed of the mobile device 10 is high, the display system Sys1 employs the second aggregating method; thus, for example, when the user travels at the high speed, the specification of the aggregating point and the aggregation of the physical quantities will not be performed continuously in a short time.

Anti-Lost Process

In the overlapping display process, the process unit 27 can perform an anti-lost process when it has been detected that the first mobile device 20 and the second mobile device 30 are separated from each other and moved relatively. The anti-lost process is a process in which the physical quantity image I2 in the period where the first mobile device 20 and the second mobile device 30 are separated from each other and moved relatively is displayed in a different way from the physical quantity image I2 out of that period. In the display system Sys1, for example, in the case where the user has moved carrying one of the first mobile device 20 and the second mobile device 30 and leaving the other behind, the aggregating point of the physical quantities and the user travel route may not match. In this case, the process unit 27 performs the anti-lost process, so that the display of the physical quantity image I2 without the match between the aggregating point of the physical quantities and the user travel route can be prevented.

For example, the process unit 27 can detect that the first mobile device 20 and the second mobile device 30 are separated from each other and moved relatively on the basis of various detection results from the detection unit 24 and various detection results from the detection unit 36 in the second mobile device 30.

Example in which Second Mobile Device 30 is Left Behind

For example, the process unit 39 transmits the detected physical quantity information and other information detected by the detection unit 36 in the information transmission process (step S2) to the first mobile device 20, and the process unit 27 detects that the user does not wear the second mobile device 30 on the basis of the received information. For example, if the signal from the acceleration sensor in the detection unit 36 is not detected, the process unit 27 can detect that the user does not wear the second mobile device 30. If the detection unit 36 further includes an inclination sensor, when the inclination sensor is ON (in operation) and the acceleration is OFF (not in operation), the process unit 27 can detect that the user does not wear the second mobile device 30. If the detection unit 36 includes a temperature sensor, a temperature threshold is set based on the temperature difference between when the user wears the second mobile device 30 and when the user does not wear the second mobile device 30. If the temperature that is detected actually is equal to or less than the temperature threshold, the process unit 27 can detect that the user does not wear the second mobile device 30. If the detection unit 36 includes a heart rate sensor, when the heart rate is not measured, the process unit 27 can detect that the user does not wear the second mobile device 30. The process unit 27 can detect that the user does not wear the second mobile device 30 on the basis of various activity meters mounted on the second mobile device 30 as the detection unit 36. The process unit 39 may perform the similar determination on the second mobile device 30 side and may transmit the information expressing whether the device is worn to the first mobile device 20.

Figure 10:
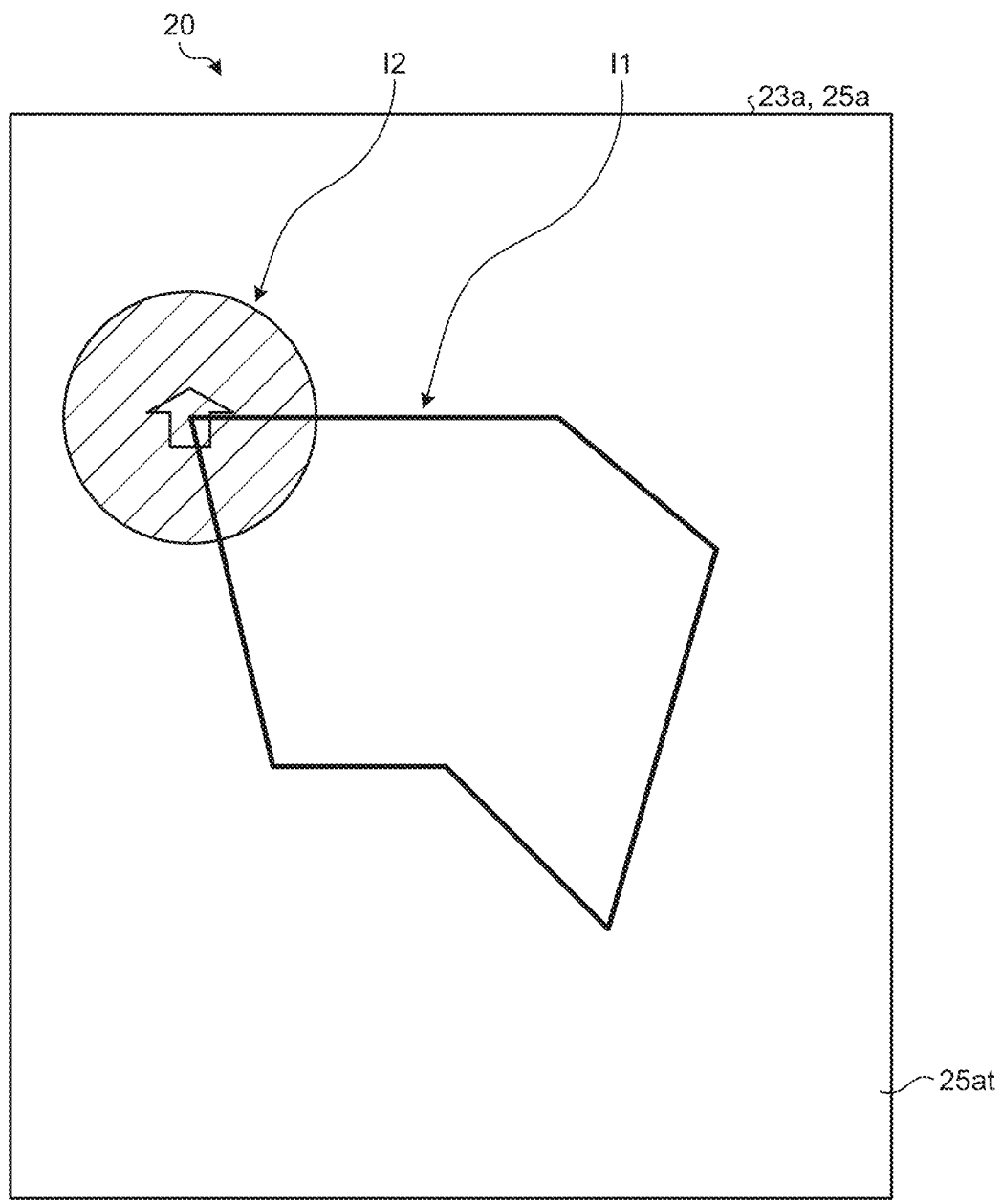
FIG. 10 is a diagram illustrating one example of a display screen in a case where an anti-lost process is performed in the display system according to the embodiment.

When it is detected that the user does not wear the second mobile device 30, that is, when it is detected that the user has moved carrying only the first mobile device 20 and leaving the second mobile device 30 behind, the process unit 27 may perform the display of a display screen as illustrated in FIG. 10 as the anti-lost process. In this case, as illustrated in FIG. 10, the process unit 27 performs the display of the physical quantity image I2 assuming that the entire physical quantities detected in the period where the first mobile device 20 and the second mobile device 30 are separated from each other and moved relatively is the physical quantity that is detected at a place where the user has left the second mobile device 30. In this case, the process unit 27 may display the physical quantity image I2 in different color and shape from the physical quantity image I2 in a normal period where the user moves carrying both the first mobile device 20 and the second mobile device 30. In this case, as a modification, the process unit 27 can cancel the overlapping display process and perform the display of only the physical quantity image I2 without the travel route image I1.

Figure 11:
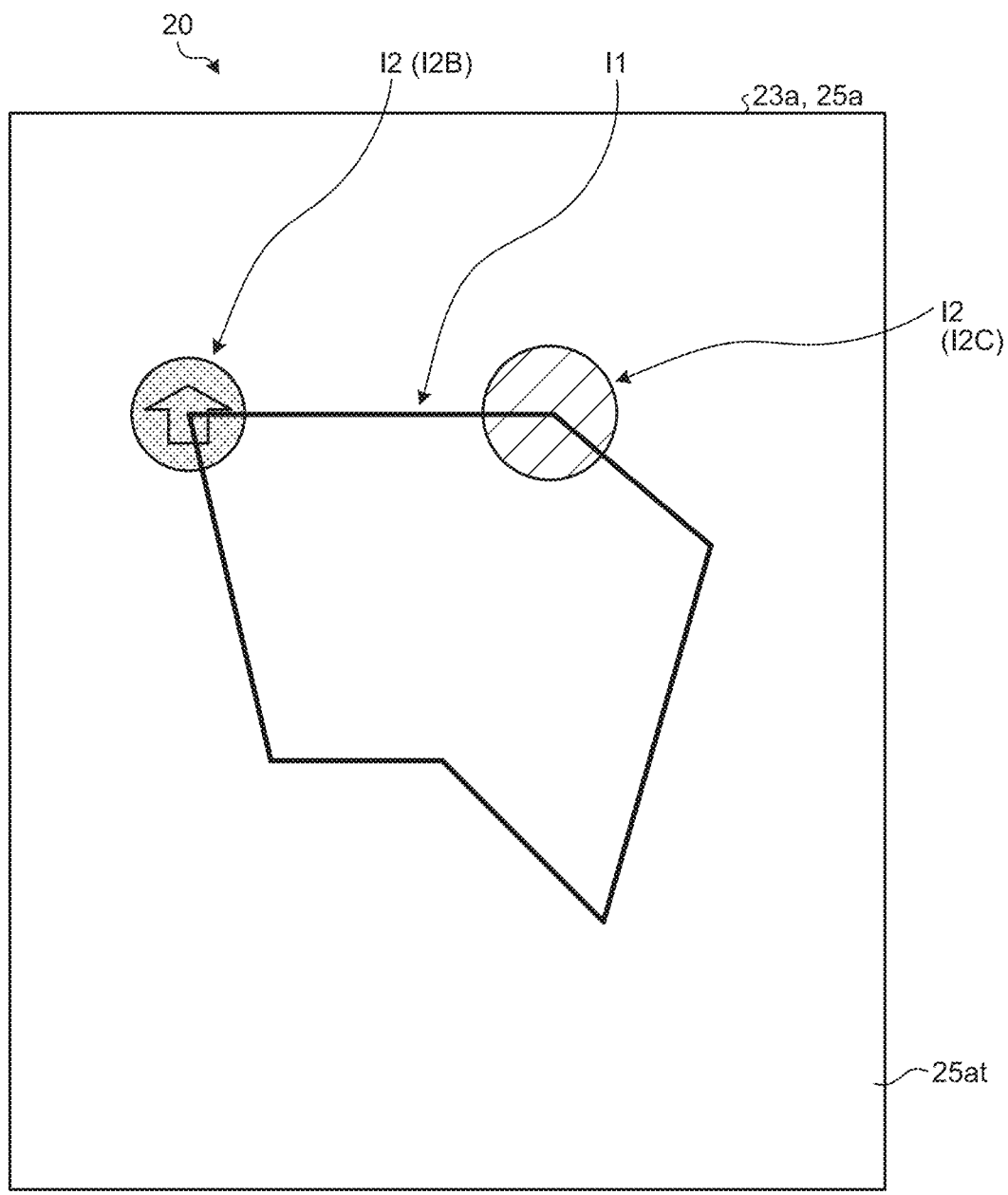
FIG. 11 is a diagram illustrating one example of the display screen in the case where the anti-lost process is performed in the display system according to the embodiment.

If it is detected that the user who has carried both the first mobile device 20 and the second mobile device 30 leaves the second mobile device 30 behind at any point and moves only with the first mobile device 20, the process unit 27 may perform the display of a display screen as illustrated in FIG. 11 as the anti-lost process. In this case, as illustrated in FIG. 11, the process unit 27 performs the display of the physical quantity image I2 as usual in the normal period where the user moves carrying both the first mobile device 20 and the second mobile device 30 (see physical quantity image I2B in FIG. 11). In this state, when it is detected that the user has moved carrying only the first mobile device 20 and leaving the second mobile device 30 behind, the process unit 27 performs the display of the physical quantity image I2 assuming that the entire physical quantity detected in the period where the first mobile device 20 and the second mobile device 30 are separated from each other and moved relatively is the physical quantity that is detected at a place where the user has left the second mobile device 30 (see physical quantity image I2C in FIG. 11). In this case, the process unit 27 performs the display of the physical quantity image I2C in the display color and shape different from the physical quantity image I2B. For example, in the example illustrated in FIG. 12, the total value of the physical quantities detected in the period from 10:00 to 10:15 is displayed as the physical quantity image I2B and the total value of the physical quantities detected in the period from 10:20 to 12:00 is displayed entirely as the physical quantity image I2C. Thus, the place where the user has left the second mobile device 30 can be displayed with emphasis in the display system Sys1. In this case, as a modification, the process unit 27 can cancel the overlapping display process and perform the display of only the physical quantity image I2 (physical quantity image I2B, physical quantity image I2C) without the travel route image I1.

Example in which First Mobile Device 20 is Left Behind

Figure 13:
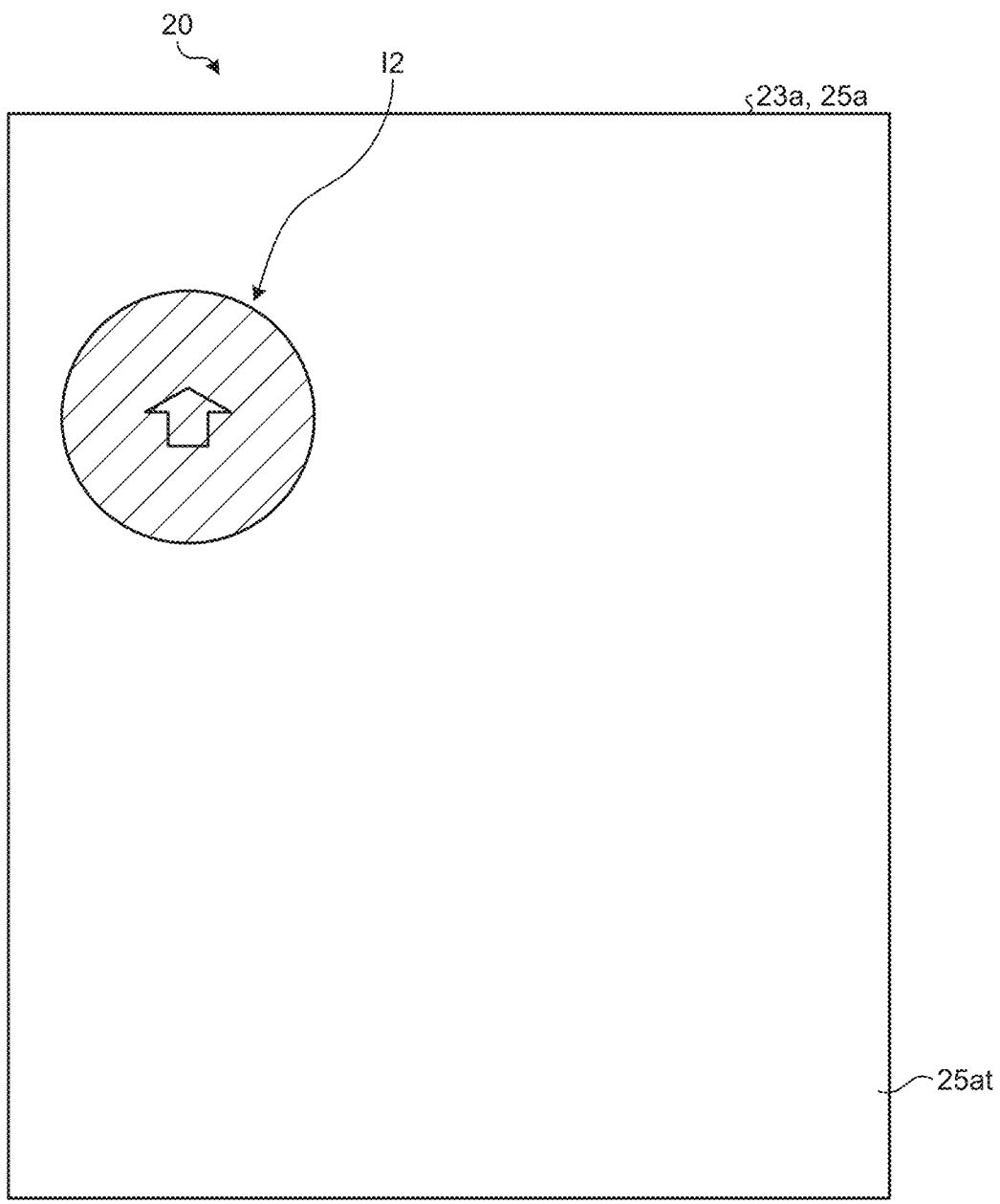
FIG. 13 is a diagram illustrating one example of the display screen in the case where the anti-lost process is performed in the display system according to the embodiment.

The process unit 27 can detect that the user does not carry the first mobile device 20 on the basis of the position detected by the position detection unit 24a in the detection unit 24. For example, the process unit 27 detects the period where it is detected that the first mobile device 20 does not move and the user wears the second mobile device 30 as the period where the user moves carrying only the second mobile device 30 and leaving the first mobile device 20 behind. In the case where it is detected that the user moves carrying only the second mobile device 30 and leaving the first mobile device 20 behind, the process unit 27 may perform the display of a display screen as illustrated in FIG. 13 as the anti-lost process. That is to say, in this case, the process unit 27 performs the display of the physical quantity image I2 assuming that the entire physical quantity detected in the period where the first mobile device 20 and the second mobile device 30 are separated from each other and moved relatively is the physical quantity that is detected at a place where the user has left the first mobile device 20 as illustrated in FIG. 13. In this case, similarly to the case illustrated in FIG. 10, the process unit 27 may perform the display of the physical quantity image I2 in the display color and shape different from the physical quantity image I2 that is in the normal period where the user has moved carrying both the first mobile device 20 and the second mobile device 30. In addition, as a modification, the process unit 27 may cancel the overlapping display process and not perform the display of the physical quantity image I2 itself.

Figure 14:
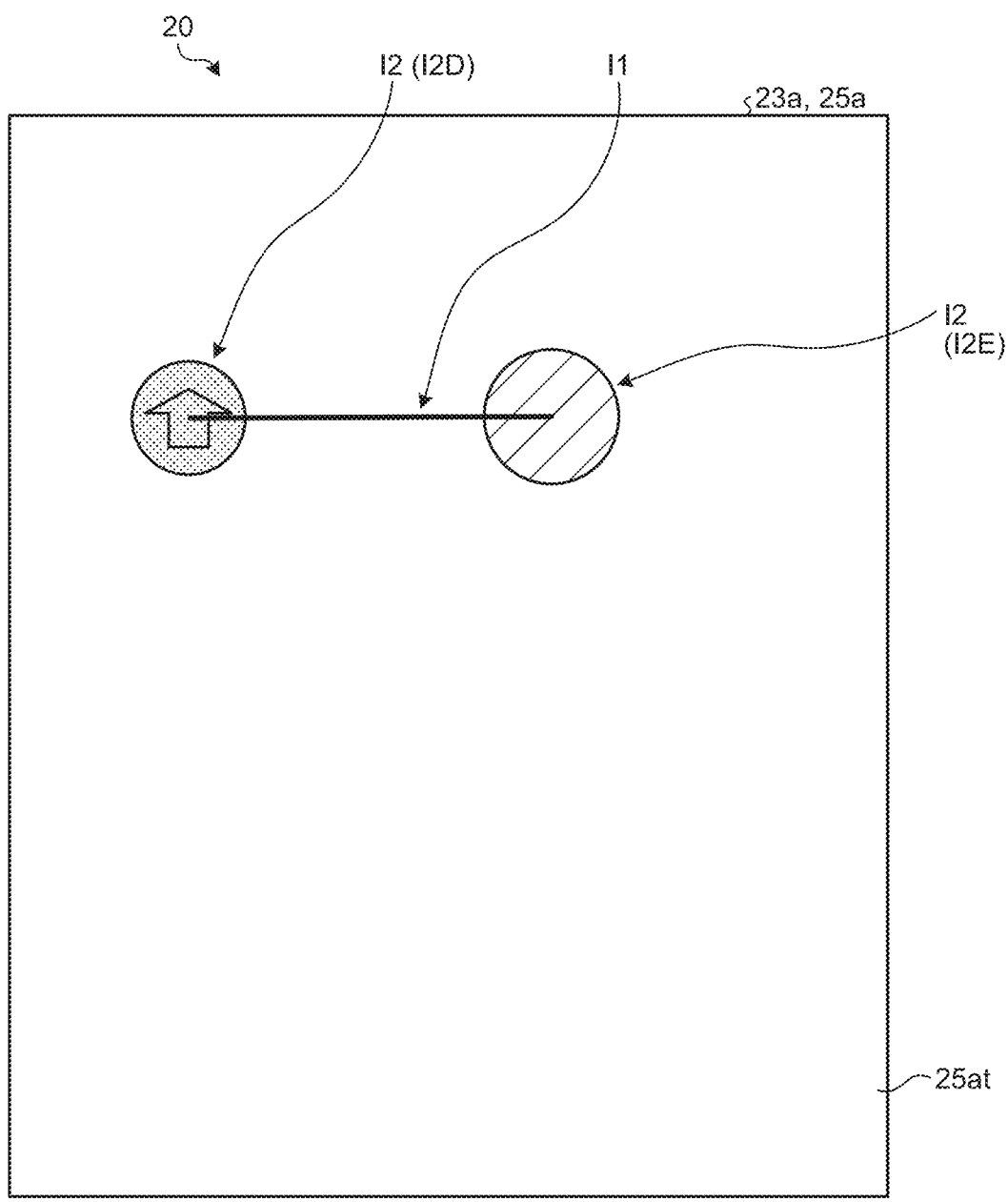
FIG. 14 is a diagram illustrating one example of the display screen in the case where the anti-lost process is performed in the display system according to the embodiment.

If it is detected that the user who has carried both the first mobile device 20 and the second mobile device 30 leaves the first mobile device 20 behind at any point and moves only with the second mobile device 30, the process unit 27 may perform the display of a display screen as illustrated in FIG. 14 as the anti-lost process. That is to say, in this case, in the normal period where the user moves carrying both the first mobile device 20 and the second mobile device 30, the process unit 27 performs the display of the physical quantity image I2 as usual as illustrated in FIG. 14 (see physical quantity image I2D in FIG. 14). In this state, when it is detected that the user has moved carrying only the second mobile device 30 and leaving the first mobile device 20 behind, the process unit 27 performs the display of the physical quantity image I2 assuming that the entire physical quantity detected in the period where the first mobile device 20 and the second mobile device 30 are separated from each other and moved relatively is the physical quantity that is detected at a place where the user has left the first mobile device 20 (see physical quantity image I2E in FIG. 14). In this case, similarly to the case illustrated in FIG. 11, the process unit 27 performs the display of the physical quantity image I2E in the display color and shape different from the physical quantity image I2D. Thus, the place where the user has left the first mobile device 20 can be displayed with emphasis in the display system Sys1. In this case, as a modification, the process unit 27 can cancel the overlapping display process and perform the display of only the physical quantity image I2 (physical quantity image I2D, physical quantity image I2E) without the travel route image I1.

Operation Effect of Embodiment The display system Sys1 described above and a computer program can perform the overlapping display process by the position detection unit 24a, the physical quantity detection unit 36a, the display unit 25a, and the process unit 27 in the mobile device 10 including the process unit 27. Thus, the display system Sys1 and the computer program can cause the display unit 25a in the mobile device 10 to display the physical quantity image I2 expressing the physical quantity detected in the mobile device 10 in a manner of overlapping on the travel route image I1 expressing the travel route of the mobile device 10. Therefore, the display system Sys1 and the computer program can perform the easy-to-understand display of the physical quantity detected by the mobile device 10 in association with the activity of the user who carries the mobile device 10. Accordingly, the display system Sys1 and the computer program can make it easy to understand the cause and effect relation between the detected physical quantity and the user activity range, for example. As a result, the display system Sys1, the computer program, the mobile device 10, and the second mobile device 30 serving as the wearable device can display the detected physical quantity properly.

More specifically, in the overlapping display process, the display system Sys1 and the computer program can perform the display of the physical quantity image I2 expressing the physical quantity detected at a particular place in the travel route in a manner of overlapping on the position corresponding to the particular place in the travel route image I1. Therefore, the display system Sys1, the computer program, the mobile device 10, and the second mobile device 30 serving as the wearable device can properly express the physical quantity detected at the particular place in the travel route as the physical quantity image I2 and make it easy to understand the physical quantity at the particular place.

Moreover, the display system Sys1 described above and the computer program can cause the display unit 25a of the first mobile device 20 to display the physical quantity image I2 expressing the physical quantity detected by the physical quantity detection unit 36a of the second mobile device 30 in a manner of overlapping on the travel route image I1. As a result, the display system Sys1, the computer program, the mobile device 10, and the second mobile device 30 serving as the wearable device can properly display the detected physical quantity by making the first mobile device 20 and the second mobile device 30 in the mobile devices 10 work together.

Here, in the display system Sys1 described above and the computer program, the second mobile device 30 for detecting the physical quantity among the mobile devices 10 is the wearable device that a person can wear. Therefore, the display system Sys1, the computer program, the mobile device 10 and the second mobile device 30 serving as the wearable device can display properly the physical quantity detected in the circumstance where the device is worn by the user and is close to the user.

For example, the display system Sys1 described above and the computer program can perform the display of the physical quantity image I2 expressing the power generation amount of the power generated in the second mobile device 30, which is the electronic watch, as the physical quantity detected by the physical quantity detection unit 36a in a manner of overlapping on the travel route image I1. Thus, the display system Sys1 and the computer program can make it easy to understand the cause and effect relation between the power generation amount of the power generated in the second mobile device 30 and the user activity range, for example. As a result, the display system Sys1, the computer program, the mobile device 10, and the second mobile device 30 serving as the wearable device can make the user easily understand where the power is generated more in the travel route. Accordingly, the display system Sys1, the computer program, the mobile device 10, and the second mobile device 30 serving as the wearable device can encourage the user to select the travel route where the power generation is easy or perform the efficient power generation at the place where the user stays long; thus, the user is made more conscious about the power generation and involved in the power generation further.

In the display system Sys1 described above and the computer program, the size of the physical quantity image I2 can be changed in accordance with the physical quantity expressed by the physical quantity image I2 in the overlapping display process. In this case, the display system Sys1, the computer program, the mobile device 10, and the second mobile device 30 serving as the wearable device can make the user recognize the magnitude of the physical quantity (power generation amount) on the basis of the size of the physical quantity image I2.

In this case, in the display system Sys1 described above and the computer program, in the overlapping display process, if the physical quantity expressed by the physical quantity image I2 is a relatively small value, the difference of the size of the physical quantity image I2 with respect to the difference of the value of the physical quantity is made relatively large, and if the physical quantity expressed by the physical quantity image I2 is a relatively large value, the difference of the size of the physical quantity image I2 with respect to the difference of the value of the physical quantity is made relatively small. Thus, the display system Sys1, the computer program, the mobile device 10, and the second mobile device 30 serving as the wearable device can express effectively the magnitude of the physical quantity expressed by the physical quantity image I2 with the size of the physical quantity image I2. That is to say, although the difference is small while the physical quantity expressed by the physical quantity image I2 is relatively small, the display system Sys1 can make it easy to recognize the difference of the physical quantity. On the other hand, when the physical quantity expressed by the physical quantity image I2 is relatively large, the display system Sys1 can make the difference of the physical quantity recognizable after the large difference is generated.

In addition, the display system Sys1 described above and the computer program can change the display color or the transmissivity of the physical quantity image I2 in accordance with the physical quantity expressed by the physical quantity image I2 in the overlapping display process. In this case, the display system Sys1, the computer program, the mobile device 10, and the second mobile device 30 serving as the wearable device can make the user recognize the magnitude of the physical quantity (power generation amount) with the display color or the transmissivity of the physical quantity image I2.

Moreover, the display system Sys1 described above and the computer program can restrict the maximum size and the minimum size of the physical quantity image I2 within a predetermined ratio on the basis of the size of the display area 25at of the display unit 25a in the overlapping display process. Thus, the display system Sys1, the computer program, the mobile device 10, and the second mobile device 30 serving as the wearable device can make it easy to see the display on the display unit 25a in the overlapping display process. That is to say, the display system Sys1 and the computer program can restrict the maximum size of the physical quantity image I2 within the display area 25at so that the physical quantity image I2 does not go out of the frame. Furthermore, the display system Sys1 and the computer program can make the minimum size of the physical quantity image I2 easy for the user to see.

The display system Sys1 described above and the computer program can perform the display of the physical quantity images I2 in the overlapping and distinguishable manner for each predetermined unit time in the overlapping display process. Thus, the display system Sys1, the computer program, the mobile device 10, and the second mobile device 30 serving as the wearable device can achieve the display about the detected physical quantity in the more various ways.

Additionally, in the overlapping display process, the display system Sys1 described above and the computer program can perform the sequential display of the physical quantities expressed by the physical quantity images 2 images in accordance with the operation for the overlapping physical quantity images I2. In this point, the display system Sys1, the computer program, the mobile device 10, and the second mobile device 30 serving as the wearable device can also achieve the display about the detected physical quantity in the more various ways.

The display system Sys1 described above and the computer program can change the method of aggregating the physical quantities to be displayed in the overlapping display process on the basis of the travel speed of the mobile device 10. Thus, the display system Sys1, the computer program, the mobile device 10, and the second mobile device 30 serving as the wearable device can achieve the more suitable aggregation of the physical quantities in accordance with the situations, and about the detected physical quantity, achieve the proper display in accordance with the user travel pattern.

For example, in the case where the travel speed of the mobile device 10 is relatively low, the display system Sys1 described above and the computer program aggregate the physical quantities in accordance with the travel distance of the mobile device 10 and in the case where the travel speed of the mobile device 10 is relatively high, aggregate the physical quantities in accordance with the elapsed time. In this case, the display system Sys1 and the computer program can prevent the specification of the aggregating point and the aggregation of the physical quantities from being performed continuously more than necessary. As a result, the display system Sys1, the computer program, the mobile device 10, and the second mobile device 30 serving as the wearable device can prevent that too many physical quantity images I2 are displayed to interrupt the view and reduce the calculation amount to achieve the lower power consumption.

In the overlapping display process, the display system Sys1 described above and the computer program can perform the anti-lost process when it has been detected that the first mobile device 20 and the second mobile device 30 are separated from each other and moved relatively. In the anti-lost process, the display of the physical quantity image in that period and the display of the physical quantity out of the period are made different. Thus, if the user has moved carrying one of the first mobile device 20 and the second mobile device 30 and leaving the other behind, the display system Sys1, the computer program, the mobile device 10, and the second mobile device 30 serving as the wearable device can prevent the display of the physical quantity image I2 without the match between the aggregating point of the physical quantities and the user travel route. Moreover, the display system Sys1, the computer program, the mobile device 10, and the second mobile device 30 serving as the wearable device can display the place where the user has left the first mobile device 20 or the second mobile device 30 with emphasis; thus, the user can easily know the position where he left the first mobile device 20 or the second mobile device 30.

Moreover, the display system Sys1, the computer program, the mobile device 10, and the second mobile device 30 serving as the wearable device can construct a cooperation system that achieves the easy-to-understand display as described above by causing the first mobile device 20, the second mobile device 30, and the server 40 to communicate with each other and cooperate with each other.

The display system, the computer program, the mobile device, and the wearable device according to the aforementioned embodiment of the present invention are not limited to the embodiment described above and various changes are possible within the range described in the scope of claims. The display system, the computer program, the mobile device, and the wearable device according to the present embodiment may be formed by combining the components described in the embodiment and the modifications as appropriate.

The first mobile device 20 is the smartphone and the second mobile device 30 is the electronic watch (wristband type wearable device) in the above example; however, these devices are not limited thereto. The first mobile device 20 and the second mobile device 30 may be any electronic device that the user can carry.

The display system Sys1 includes the first mobile device 20 and the second mobile device 30 as the mobile devices 10 in the above example; however, the structure of the display system Sys1 is not limited thereto. Furthermore, the server 40 is provided in addition to the mobile devices 10 in the above example; however, the structure is not limited thereto. In the display system Sys1, for example, the processes including the overlapping display process may complete in one mobile device. In this case, one mobile device includes all of the position detection unit, the physical quantity detection unit, the display unit, and the process unit that performs the overlapping display process. The display system Sys1 may include three or more mobile devices as the mobile devices 10.

The physical quantity detected in the mobile device 10 and displayed in the overlapping display process is the power generation amount of the power generated in the second mobile device 30 in the above example; however, the physical quantity is not limited to the power generation amount. The physical quantity may alternatively be the temperature or ultraviolet ray quantity detected by the physical quantity detection unit, for example, or other quantity. The physical quantity may be the consumption calorie or the basal metabolism quantity based on the physical quantity detected by the physical quantity detection unit, for example. In this case, for example, the first mobile device 20 or the second mobile device 30 may store the user information (height, weight, etc.) therein in advance and calculate the consumption calorie or the basal metabolism quantity on the basis of the user information and the physical quantity such as acceleration detected by the material quantity detection unit. In addition, in the overlapping display process, the mobile device 10 may display the physical quantity images expressing the physical quantities in the overlapping manner.

The mobile device 10 described above may display the physical quantity (power generation amount) in the time series in the unit of time or day in another display screen, in addition to the display of the overlapping display process.

The process unit 27 changes the method of aggregating the physical quantity displayed in the overlapping display process on the basis of the travel speed of the mobile device 10 in the above example; however, the structure is not limited to thereto.

The method of aggregating the physical quantity may be a single method regardless of the situation.

The process unit 27 performs the anti-lost process if it has been detected that the first mobile device 20 and the second mobile device 30 are separated from each other and moved relatively in the above description; however, the structure is not limited to this example.

Each of the mobile device 10 and the server 40 is structured as a single device in the above description; however, the structure is not limited to this example. The function dispersion mode of the mobile device 10 and the server 40 is not limited to the above example, and the mobile device 10 and the server 40 may be dispersed and integrated functionally or physically in an arbitrary unit within the range that can achieve the similar effect or function. The computer programs and various data, etc. described above may be updated as appropriate, and may be stored in another server connected to the mobile device 10 and the server 40 through the arbitrary network N. The computer programs and various data, etc. described above may be recorded in a computer-readable recording medium such as a hard disk, a flexible disk (FD), a CD-ROM, an MO, or a DVD, read out from the recording medium by a computer and executed. In addition, the process functions of the process units 27 and 39 and the server 40 may be achieved partially or entirely by a CPU or the like, or by computer programs, which are construed and executed by the CPU or the like, or may be achieved as hardware by wired logic or the like.

Modification of Aggregating Method

The process unit 27 employs the first aggregating method based on the travel distance of the mobile device 10, the second aggregating method based on the elapsed time, or using these methods for different cases depending on the travel speed of the mobile device 10 in the above example; however, the structure is not limited to this example. For example, the process unit 27 may aggregate the physical quantity at each point (corresponding to a particular place in the travel route as described above) on the condition that the travel distance and the elapsed time of the mobile device 10 both satisfy a predetermined threshold.

Specifically, the process unit 27 specifies the current particular place on the condition that, for example, the travel distance of the mobile device 10 from the previous particular place that has been specified previously is over a determination distance that is set in advance and the elapsed time after the previous particular place is specified is over a determination period that is set in advance. Here, the determination distance is a threshold that is set in advance for the travel distance of the mobile device 10 from the particular place that has been specified previously, and may be set arbitrarily. Similarly, the determination period is a threshold that is set in advance for the elapsed time after the previous particular place is specified and may be set arbitrarily. That is to say, the process unit 27 specifies the travel point (corresponding to each particular place in the travel route described above) every time the travel distance of the mobile device 10 and the elapsed time both satisfy the above condition. Then, the process unit 27 determines that the total physical quantity detected by the physical quantity detection unit 36a from the previously specified particular place to the currently specified particular place is the physical quantity at the particular place that is specified currently.

On the contrary, in the case where the travel distance of the mobile device 10 from the previously specified particular place is not over the determination distance that is set in advance, or the elapsed time after the particular place is specified previously is not over the determination period that is set in advance, the process unit 27 does not specify the current particular place and continues the aggregation, and does not advance to the aggregation in a next particular place. That is to say, in the case where the travel distance of the mobile device 10 from the previously specified particular place is over the determination distance that is set in advance but the elapsed time after the previous particular place is specified is not over the determination period that is set in advance, the process unit 27 does not specify the current particular place and continues the aggregation, and does not advance to the next aggregation. Similarly, in the case where the elapsed time after the previous particular place is specified is over the determination period that is set in advance but the travel distance of the mobile device 10 from the previously specified particular place is not over the determination distance that is set in advance, the process unit 27 does not specify the current particular place and continues the aggregation, and does not advance to the next aggregation.

Figure 15:
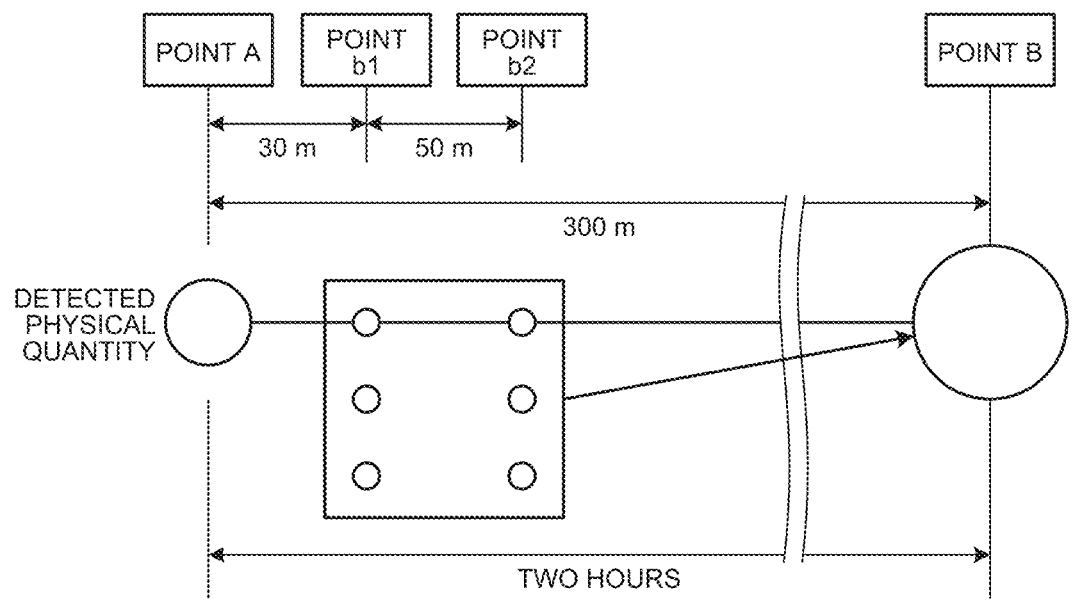
FIG. 15 is a schematic diagram for describing one example of an aggregating method for physical quantities in a display system according to a modification.
Figure 16:
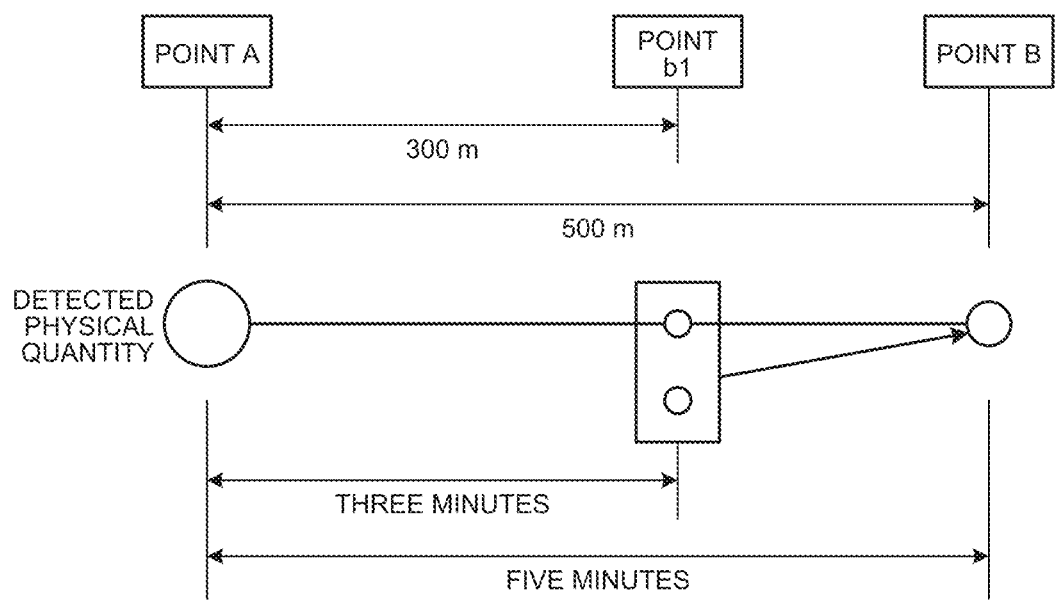
FIG. 16 is a schematic diagram for describing one example of an aggregating method for physical quantities in a display system according to a modification.

With reference to FIG. 15 and FIG. 16, one example of the method of aggregating the physical quantity according to the modification is described. In the example in FIG. 15 and FIG. 16, the determination distance that is set in advance is 300 m, and the determination period that is set in advance is five minutes as a sampling period. Note that the physical quantity detected at each point is schematically illustrated as a circular shape in FIG. 15 and FIG. 16.

In the example in FIG. 15, even if the time after the point A, the previous particular place, is specified has passed 5 minutes (determination period), the process unit 27 does not specify the current particular place before the travel distance of the user with the mobile device 10 satisfies the condition, and aggregates the physical quantities detected at a point b1 that is 30 m away from the point A and at a point b2 that is 50 m away from the point b1. Then, the process unit 27 specifies the current particular place when the user with the mobile device 10 has traveled over the point B that is 300 m (determination distance) away from the point A; then, the process unit 27 advances to the aggregation of the physical quantity at the next particular place. In this case, the process unit 27 aggregates the physical quantities detected at the point b1, the point b2, and the like and aggregates the values as the physical quantity at the point B that is the current particular place.

On the other hand, in the example in FIG. 16, even if the user with the mobile device 10 has traveled over the point b1 that is 300 m (determination distance) away from the point A, the previous particular place, the process unit 27 does not specify the current particular place before the elapsed time satisfies the condition, and aggregates the physical quantities detected at the point b1, for example. Then, at the point B where the time after the point A, the previous particular place, is specified has passed five minutes (determination period), the process unit 27 specifies the current particular place and advances to the aggregation of the physical quantity at the next particular place. In this case, the process unit 27 aggregates the physical quantity detected at the point b1 and the like and treats the total value as the physical quantity at the point B, the current particular place.

The display system Sys1 aggregates the physical quantity as above. As compared to the case in which the particular place is specified on the condition of the elapsed time only, it is possible to prevent the particular place from being specified repeatedly at substantially the same place when the travel speed of the mobile device 10 is low, for example, the travel range of the user per unit time is relatively small like when the user works in the office. On the other hand, as compared to the case in which the particular place is specified on the condition of the travel distance only, the display system Sys1 can prevent the place where the physical quantity is not detected from being specified as the particular place uselessly when the travel speed of the mobile device 10 is high, for example, the user gets in train and travels so fast. As a result, the display system Sys1, the computer program, and the mobile device 10 can reduce the unnecessary specification of the particular place or the unnecessary calculation and reduce the unnecessary power consumption. In addition, the display system Sys1, the computer program, and the mobile device 10 can achieve the more proper aggregation of the physical quantity in accordance with the situation and achieve the more proper display in accordance with the travel pattern of the user about the detected physical quantity.

Combined Display of Physical Quantity Images (Merge Display)

The process unit 27 as described above can combine (merge) the physical quantities detected at a plurality of particular places and display the physical quantities as one physical quantity image I2. Specifically, in the overlapping display process, the process unit 27 can combine the physical quantities detected by the physical quantity detection unit 36a at the particular places in a combined display range determined in accordance with a combined display reference distance that is set in advance and cause the display unit 25a to display the physical quantities as one physical quantity image I2. Here, the combined display range is to define the range where the physical quantities detected at the particular places are combined and displayed as one physical quantity image I2, and is determined in accordance with the combined display reference distance. The combined display reference distance is the distance that is set arbitrarily in advance, and is set in accordance with the range where the detected physical quantities are combined and displayed as one physical quantity image I2.

Variation 1 of Combined Display

Figure 17:
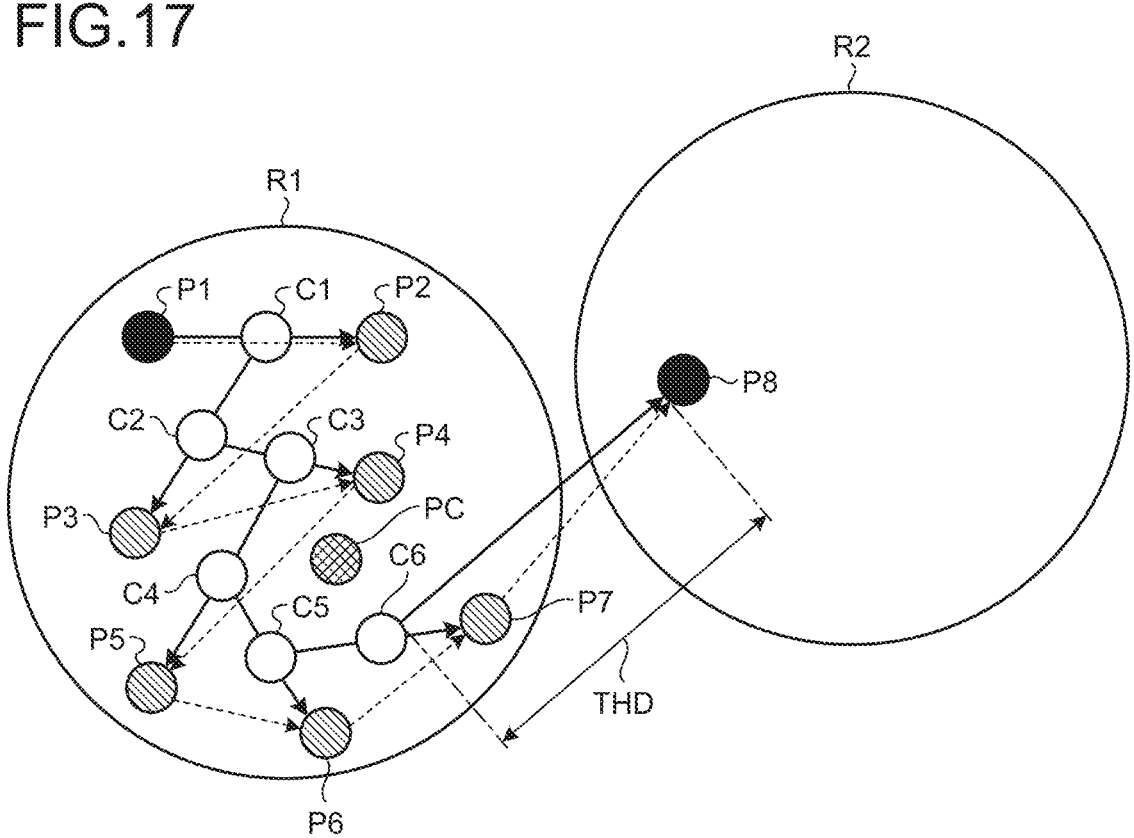
FIG. 17 is a schematic diagram for describing one example of a combined display in a display system according to a modification.

One example of the combined display of the physical quantity image I2 is described with reference to FIG. 17. FIG. 17 illustrates the example in which the combined display reference distance THD that is set in advance is 900 m. In the example in FIG. 17, the process unit 27 determines the combined display range on the basis of a reference position that is updated sequentially in accordance with the specified particular position. Note that in FIG. 17, the actual travel trajectory between the particular places specified as the user with the mobile device 10 travels is drawn with a dotted line, and the virtual travel trajectory passing the reference position is drawn with a solid line.

First, the process unit 27 determines that an intermediate position between a first particular place P1 corresponding to a start point in a first combined display range R1, and a second particular place P2 subsequent to the first particular place P1 is an initial reference position C1 as illustrated in FIG. 17. In the case where a third particular place P3 subsequent to the second particular place P2 is the current particular place, the process unit 27 performs a determination process for determining whether the distance between the reference position C1 and the current particular place P3 is equal to or more than the combined display reference distance THD.

If it is determined that the distance between the reference position C1 and the current particular place P3 is not equal to or more than the combined display reference distance THD in the determination process, the process unit 27 determines that the current particular place P3 is the particular place within the combined display range R1, updates an intermediate position between the reference position C1 and the current particular place P3 as a reference position C2 in the next determination process, and repeats the determination process. In the example in FIG. 17, the process unit 27 repeatedly performs the determination process by updating the reference position to a reference position C3, a reference position C4, a reference position C5, and a reference position C6 as the particular place moves from the third particular place P3 to a particular place P4, a particular place P5, a particular place P6, and a particular place P7.

Then, if it is determined that the distance between the reference position C6 and a current particular place P8 subsequent to the particular place P7 is equal to or more than the combined display reference distance THD in the determination process, the process unit 27 determines that the current particular place P8 is the first particular place that is a start point in the next combined display range R2.

That is to say, in the example in FIG. 17, the process unit 27 processes the particular places P1 to P7 as the particular places in the first combined display range R1 and processes the particular place P8 as the particular place in the second combined display range R2, separated from the combined display range R1.

Then, in the overlapping display process, the process unit 27 causes the display unit 25a to display one physical quantity image I2 combining (merging) the physical quantities detected by the physical quantity detection unit 36a at the particular places P1 to P7 in the combined display range R1 specified as above in a manner of overlapping on the travel route image I1 (see FIG. 4, etc.). In this case, the process unit 27 aggregates the physical quantities detected at the particular places P1 to P7 in the combined display range R1 and causes the display unit 25a to display one physical quantity image I2 according to the total physical quantity.

In this case, the process unit 27 causes the display unit 25a to display the physical quantity image I2 overlapping on the travel route image I1 at the position according to the last reference position C6 in the combined display range R1 or at the position according to a centroid position PC of the particular positions P1 to P7 in the combined display range R1. Here, the centroid position PC of the particular places P1 to P7 in the combined display range R1 typically corresponds to the centroid position (center of gravity position) in the case where the travel trajectory between the particular places P1 to P7 in the combined display range R1 is graphically expressed.

The display system Sys1, the computer program, and the mobile device 10 combine the physical quantities at the particular places and display one physical quantity image I2 as described above; thus, in the display on the display unit 25a in the overlapping display process, the image can be easily viewed.

In this case, by determining the combined display range on the basis of the reference position that is updated sequentially in accordance with the specified particular place, the display system Sys1 can reduce the storage capacity or the calculation amount of the data required when the combined display range is determined. As a result, the display system Sys1, the computer program, and the mobile device 10 can reduce the power consumption.

In addition, the display system Sys1 displays the combined physical quantity image I2 overlapping on the travel route image I1 at the position corresponding to the final reference position in the combined display range, or the position corresponding to the centroid position of the particular positions in the combined display range; thus, the proper display in accordance with the user travel pattern can be achieved while the easy-to-see image is secured as described above.

Variation 2 of Combined Display

Figure 18:
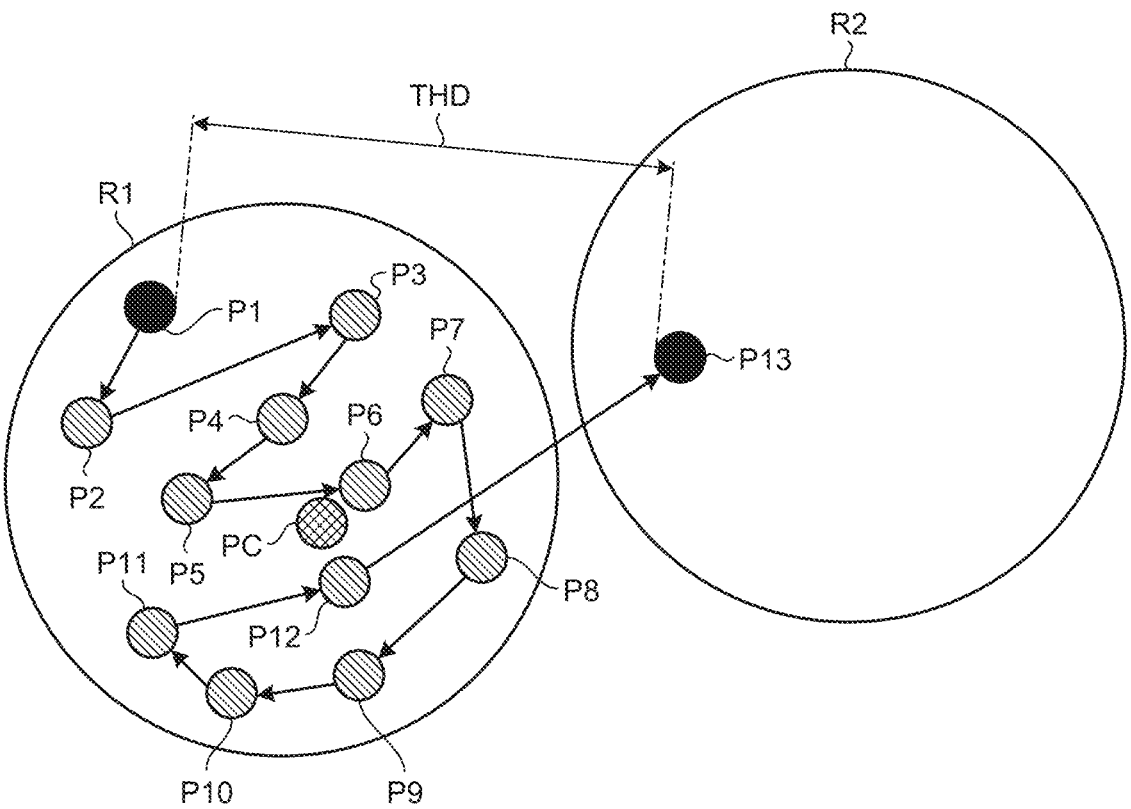
FIG. 18 is a schematic diagram for describing one example of a combined display in a display system according to a modification.

With reference to FIG. 18, another example of the combined display of the physical quantity image I2 is described. In a manner similar to FIG. 17, FIG. 18 also illustrates the example in which the combined display reference distance THD that is set in advance is 900 m. In the example in FIG. 18, the process unit 27 determines the combined display range on the basis of the particular place corresponding to the start point in the combined display range without the use of the reference position. Note that FIG. 18 illustrates the actual travel trajectory between the particular places that are specified as the user with the mobile device 10 travels.

In this case, the process unit 27 determines whether the distance between the current particular place and the particular place corresponding to the start point in the first combined display range R1 is equal to or more than the combined display reference distance THD. Then, if it is determined that the distance between the current particular place and the particular place corresponding to the start point is not equal to or more than the combined display reference distance THD in the determination process, the process unit 27 determines that the current particular place is the particular place in the first combined display range R1 and repeats the determination process about the next particular place. On the other hand, if it is determined that the distance between the current particular place and the particular place corresponding to the start point is equal to or more than the combined display reference distance THD in the determination process, the process unit 27 determines that the current particular place is the particular place corresponding to the start point of the next combined display range R2.

For example, in the example in FIG. 18, the process unit 27 performs a determination process for determining whether the distance between the first particular place P1 corresponding to the start point in the first combined display range R1 and the second particular place P2 subsequent to the first particular place P1 is equal to or more than the combined display reference distance THD.

If it is determined that the distance between the particular place P1 corresponding to the start point and the current particular place P2 is not equal to or more than the combined display reference distance THD in the determination process, the process unit 27 determines that the current particular place P2 is the particular place in the combined display range R1 and repeats the determination process subsequent to the particular place P3 that is specified next. In the example in FIG. 18, the process unit 27 repeatedly performs the determination process as the particular place moves from the third particular place P3 to the particular place P4, the particular place P5, the particular place P6, the particular place P7, the particular place P8, a particular place P9, a particular place P10, a particular place P11, and a particular place P12.

Then, if it is determined that the distance between the particular place P1 corresponding to the start point and the current particular place P13 subsequent to the particular place P12 is equal to or more than the combined display reference distance THD in the determination process, the process unit 27 determines that the current particular place P13 is the first particular place corresponding to the start point in the next combined display range R2.

That is to say, in the example in FIG. 18, the process unit 27 processes the particular places P1 to P12 as the particular places in the first combined display range R1, and processes the particular place P13 as the particular place in the second combined display range R2, separated from the combined display range R1.

Then, in the overlapping display process, the process unit 27 causes the display unit 25a to display the one physical quantity image I2 resulting from combining (merging) the physical quantities detected by the physical quantity detection unit 36a at the particular places P1 to P12 in the combined display range R1 that is specified as above in a manner of overlapping on the travel route image I1 (see FIG. 4, etc.). In this case, the process unit 27 aggregates the physical quantities detected at the particular places P1 to P12 in the combined display range R1 and causes the display unit 25a to display one physical quantity image I2 according to the total physical quantity.

In this case, the process unit 27 causes the display unit 25a to display the physical quantity image I2 overlapping on the travel route image I1 at the position according to the final particular place P12 in the combined display range R1 or the position according to the centroid position PC of the particular places P1 to P12 in the combined display range R1.

Even in this case, the display system Sys1, the computer program, and the mobile device 10 combine the physical quantities at the particular places as described above and display one physical quantity image I2; thus, in the display on the display unit 25a in the overlapping display process, the easy-to-see display can be achieved.

Combined Display According to Display Magnification

Note that, in the overlapping display process, the process unit 27 may change the combined display reference distance in accordance with the display magnification of the display area 25at in the display unit 25a and the size of the combined display range that is determined thereby. For example, as the display magnification of the display area 25at in the display unit 25a is higher (that is, display is magnified more), the process unit 27 makes the combined display reference distance relatively shorter and the combined display range relatively smaller. On the other hand, as the display magnification of the display area 25at in the display unit 25a is lower (that is, display is reduced more), the process unit 27 makes the combined display reference distance relatively longer and the combined display range relatively larger. Thus, the display system Sys1, the computer program, and the mobile device 10 can cause the display unit 25a to display the easy-to-see image in accordance with the display magnification in the overlapping display process.

<Modification of Variation of Physical Quantity Image: Display of Physical Quantity Detected in Mobile Devices>

In the overlapping display process described above, the physical quantity image I2 can be displayed on the display unit 25a in various display modes; however, the process is not limited to the aforementioned <variation 1: size change>, <variation 2: color parameter change>, etc. In the overlapping display process, in the case where one user owns multiple second mobile devices 30, for example, the process unit 27 can change the display mode of the physical quantity image I2 in accordance with the second mobile devices 30 that have detected the physical quantities.

Figure 19:
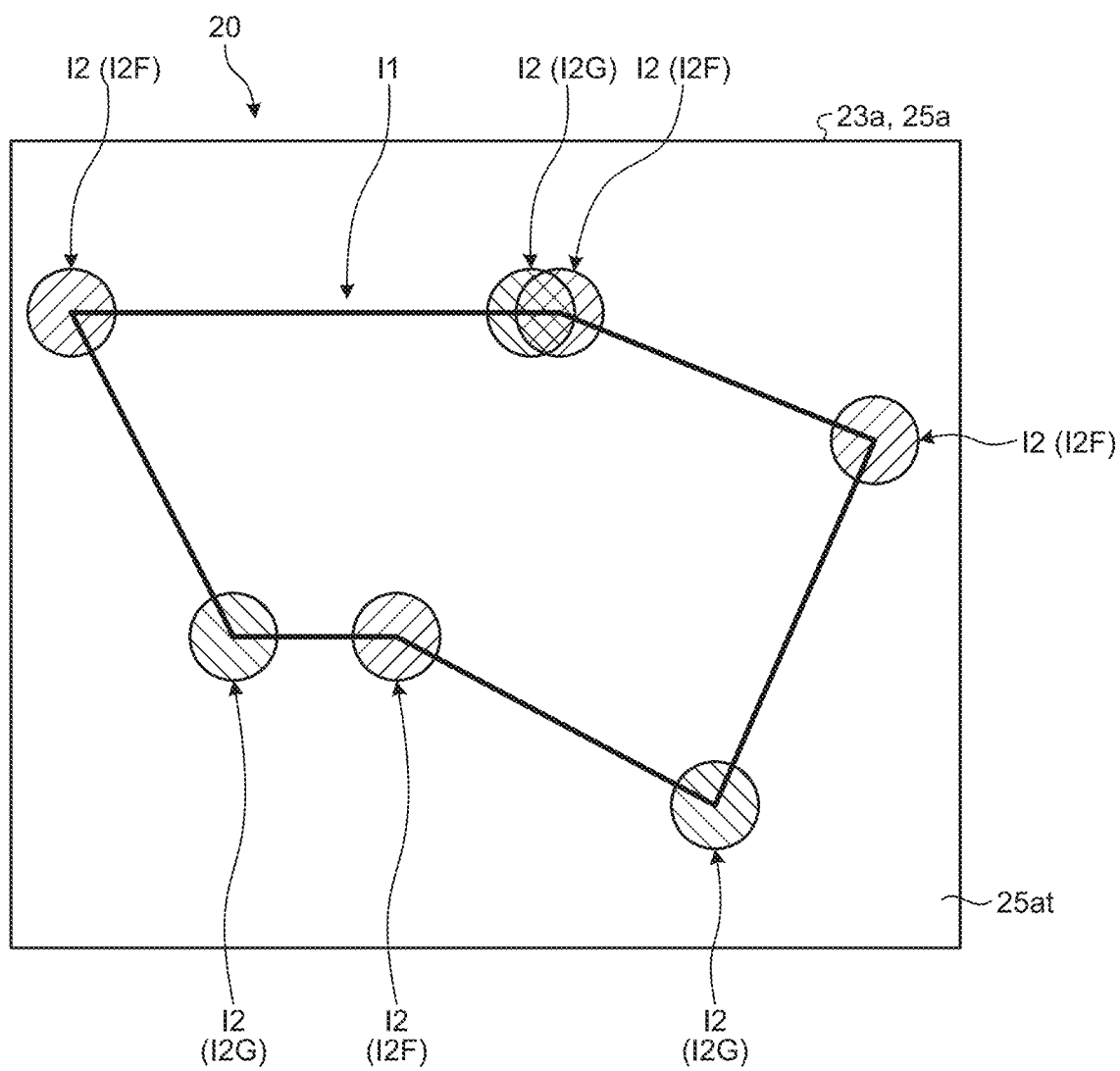
FIG. 19 is a diagram illustrating one example of a display screen in a case where a display mode of physical quantity images is changed in accordance with a plurality of second mobile devices in a display system according to a modification.

For example, in the overlapping display process, the process unit 27 can change the display mode of the physical quantity image I2 in accordance with the second mobile device 30 that has detected the physical quantity as illustrated in FIG. 19. In this case, the process unit 27 performs the display of the physical quantity images I2 in different colors or with different patterns for the respective second mobile devices 30. In the example in FIG. 19, for example, the process unit 27 performs the display of the physical quantity detected in a first second mobile device 30 as a physical quantity image I2F and the physical quantity detected in a second second mobile device 30 as a physical quantity image I2G that is different from the physical quantity image I2F. Thus, in the case where one user owns the second mobile devices 30, for example, the display system Sys1 performs the display of the physical quantity images I2 in different display modes depending on the second mobile devices 30, and thus, the physical quantity detected in each second mobile device 30 can be displayed distinguishably.

Selective Display in Overlapping Display Process

In addition, the process unit 27 allows the user to select the physical quantity image I2 to be displayed on the display unit 25a in the overlapping display process.

For example, in the overlapping display process, the process unit 27 can select the day when the user with the mobile device 10 is very active and cause the display unit 25a to display the physical quantity detected on that very active day as the physical quantity image I2. In this case, for example, the process unit 27 extracts the day when the activity quantity detected by various activity meters mounted as the detection unit 36 in the second mobile device 30 is over a threshold that is set in advance, as the "very active day". Then, the process unit 27 causes the display unit 25a to display a list of the extracted "very active days" as a selection screen. Then, on the selection screen, the process unit 27 makes the user select his desired "very active day" through a user selection operation on the touch panel 23a and causes the display unit 25a to display the physical quantity detected on the selected "very active day" as the physical quantity image I2.

In addition, in the overlapping display process, the process unit 27 can switch the physical quantities detected on the same day selected arbitrarily by the user (for example, the physical quantities detected on January 1) for each year and cause the display unit 25a to display the selected physical quantity image I2.

In the aforementioned overlapping display process, the display system Sys1, the computer program, and the mobile device 10 cause the display unit 25a to display the physical quantity selected arbitrary by the user as the physical quantity image I2 selectively; thus, the easy-to-understand display that satisfies the user's need can be achieved.

Sharing of Detected Physical Quantity Information

In the display system Sys1 described above, the detected physical quantity information that is transmitted from the first mobile device 20 to the server 40 and stored and accumulated in the server 40 can be shared with another user. In this case, the display system Sys1 makes the user on the side of providing the physical quantity information set the filter information that defines the target user, the target period, the target area, the target physical quantity, or the like for sharing the information through the touch panel 23a of the first mobile device 20, for example. On the basis of the set filter information, the display system Sys1 can restrict the detected physical quantity information to share with the first mobile device 20 of another user and cause the display unit 25a or the like to display the physical quantity image I2 in the restricted content range. As a result, the display system Sys1, the computer program, and the mobile device 10 can use the detected physical quantity more effectively.

Change of Regular Communication Intervals

The display system Sys1 described above can change the intervals of the regular communication between the first mobile device 20 and the second mobile device 30 in accordance with the situation.

For example, since the storage unit 38 in the second mobile device 30 usually has the relatively small storage capacity, keep accumulating the detected physical quantity information or the like in the storage unit 38 without communicating with the first mobile device 20 may result in the early shortage of storage capacity in the storage unit 38. In this case, the second mobile device 30 communicates with the first mobile device 20 to transmit the data such as detected physical quantity information to the first mobile device 20 and deletes the transmitted data from the storage unit 38; thus, the storage capacity for the transmitted data can be secured in the storage unit 38.

When the second mobile device 30 automatically communicates with the first mobile device 20 every day on the regular basis (for example, auto-advertisement including time correction), if the first mobile device 20 and the second mobile device 30 are not in the positional relation capable of communication, the automatic communication is not performed and as a result, the transmission of the data to the first mobile device 20 fails and thus, the storage capacity in the storage unit 38 is not secured sufficiently.

In view of this, the second mobile device 30 may perform the regular automatic communication with the first mobile device 20 more often in a day if the storage of the storage unit 38 has exceeded a predetermined level that is set in advance. In a normal state where the storage of the storage unit 38 is less than the predetermined level that is set in advance, for example, the second mobile device 30 tries the regular automatic communication with the first mobile device 20 at 3:00 a.m., once a day. In such a specification, if the storage of the storage unit 38 is over the predetermined level that is set in advance, that is, in the capacity shortage state, the number of times is increased (for example, eight times of 3:00, 6:00, 9:00, 12:00, 15:00, 18:00, 21:00, and 24:00).

Thus, the second mobile device 30 can try the automatic communication with the first mobile device 20 whenever the storage capacity in the storage unit 38 becomes relatively small, and can transmit the data out to the first mobile device 20. As a result, the display system Sys1, the computer program, the mobile device 10, and the second mobile device 30 serving as the wearable device can prevent the detected physical quantity information that is obtained once in the second mobile device 30 from being overwritten, and the detected physical quantity can be utilized to a maximum degree.

The display system, the mobile device, and the wearable device according to the present invention can perform the overlapping display process with the position detection unit, the physical quantity detection unit, the display unit, and the process unit of the mobile device including the process unit. Thus, the display system, the mobile device, and the wearable device can cause the display unit of the mobile device to display the physical quantity image expressing the physical quantity detected in the physical quantity detection unit in a manner of overlapping on the travel route image expressing the travel route of the mobile device. Therefore, the display system, the mobile device, and the wearable device can perform the easy-to-understand display of the physical quantity detected by the physical quantity detection unit in association with the activity of the user with the mobile device. As a result, the display system, the mobile device, and the wearable device can obtain the effect that the detected physical quantity can be displayed properly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display system comprising:
a mobile device including
a position detection unit that detects a position,
a physical quantity detection unit that detects a physical quantity,
a display unit that displays an image, and
a process unit that is able to perform a process of controlling the display unit so that the image is displayed,
wherein the process unit is able to perform an overlapping display process in which the process unit controls the display unit so as to display a physical quantity image expressing the physical quantity detected by the physical quantity detection unit in a manner of overlapping on a travel route image expressing a travel route of the mobile device that is determined depending on the position detected by the position detection unit, and
wherein the process unit is able to perform the display of a plurality of the physical quantity images in an overlapping and distinguishable manner for each predetermined unit time in the overlapping display process.

2. The display system according to claim 1, wherein in the overlapping display process, the process unit performs display of the physical quantity image expressing the physical quantity detected by the physical quantity detection unit at a particular place in the travel route in a manner of overlapping on a position corresponding to the particular place in the travel route image.

3. A display system comprising:
a mobile device including
a position detection unit that detects a position,
a physical quantity detection unit that detects a physical quantity,
a display unit that displays an image, and
a process unit that is able to perform a process of controlling the display unit so that the image is displayed,
wherein the process unit is able to perform an overlapping display process in which the process unit controls the display unit so as to display a physical quantity image expressing the physical quantity detected by the physical quantity detection unit in a manner of overlapping on a travel route image expressing a travel route of the mobile device that is determined depending on the position detected by the position detection unit,
wherein
the mobile device includes a first mobile device and a second mobile device capable of communicating with each other,
the second mobile device includes the physical quantity detection unit and transmits detected physical quantity information about the physical quantity detected by the physical quantity detection unit to the first mobile device, and
the first mobile device includes the position detection unit, the display unit, and the process unit and the process unit performs the overlapping display process by controlling the display unit on the basis of detected position information about the position detected by the position detection unit and the detected physical quantity information received from the second mobile device.

4. The display system according to claim 3, wherein the second mobile device is a wearable device that a person is able to wear.

5. The display system according to claim 3, wherein the second mobile device is an electronic watch that displays time with hands, and
the physical quantity detected by the physical quantity detection unit is a power generation amount of power generated in the second mobile device.

6. The display system according to claim 1, wherein the process unit is able to change a size of the physical quantity image in accordance with the physical quantity expressed by the physical quantity image in the overlapping display process.

7. The display system according to claim 6, wherein in the overlapping display process, when the physical quantity expressed by the physical quantity image is a relatively small value, the process unit makes a difference of a size of the physical quantity image with respect to a difference of the value of the physical quantity relatively large, and when the physical quantity expressed by the physical quantity image is a relatively large value, the process unit makes the difference of the size of the physical quantity image with respect to the difference of the value of the physical quantity relatively small.

8. The display system according to claim 1, wherein the process unit is able to change a display color or a transmissivity of the physical quantity image in accordance with the physical quantity expressed by the physical quantity image in the overlapping display process.

9. The display system according to claim 1, wherein the process unit restricts a maximum size and a minimum size of the physical quantity image within a predetermined ratio on the basis of a size of a display area of the display unit in the overlapping display process.

10. The display system according to claim 1, wherein the process unit performs sequential display of the physical quantities expressed by the physical quantity images in accordance with operation for the overlapping physical quantity images in the overlapping display process.

11. The display system according to claim 1, wherein the process unit is able to change a method of aggregating the physical quantities to be displayed in the overlapping display process on the basis of travel speed of the mobile device.

12. The display system according to claim 11, wherein when the travel speed of the mobile device is relatively low, the process unit aggregates the physical quantities in accordance with a travel distance of the mobile device, and when the travel speed of the mobile device is relatively high, the process unit aggregates the physical quantities in accordance with elapsed time.

13. The display system according to claim 3, wherein
when it is detected that the first mobile device and the second mobile device are separated from each other and moved relatively, the process unit performs an anti-lost process in a manner that the display of the physical quantity image in a period where the first mobile device and the second mobile device are separated from each other and moved relatively and the display of the physical quantity out of the period are made different in the overlapping display process.

14. The display system according to claim 1, further comprising:
a server that is able to communicate with the mobile device and stores therein information to be transmitted to and received from the mobile device.

15. The display system according to claim 1, wherein
the process unit specifies a current particular place on a condition that a travel distance of the mobile device from a particular place in the travel route that is specified previously is over a determination distance that is set in advance and an elapsed time after the particular place is specified previously is over a determination period that is set in advance, and the process unit determines that a total value of the physical quantity detected by the physical quantity detection unit from the previously specified particular place to the currently specified particular place is the physical quantity at the particular place that is specified currently.

16. The display system according to claim 1, wherein
in the overlapping display process, the process unit combines the physical quantities detected by the physical quantity detection unit at a plurality of particular places in the travel route in a combined display range determined in accordance with a combined display reference distance that is set in advance and performs display of the combined physical quantity as the one physical quantity image.

17. The display system according to claim 16, wherein
the process unit determines that an intermediate position between a first particular place corresponding to a start point in the combined display range, and a second particular place subsequent to the first particular place is an initial reference position, and performs a determination process for determining whether a distance between the reference position and the current particular place is equal to or more than the combined display reference distance,
when it is determined that the distance between the reference position and the current particular place is not equal to or more than the combined display reference distance in the determination process, the process unit determines that the current particular place is the particular place in the combined display range and repeats the determination process after updating an intermediate position between the reference position and the current particular place to be the reference position in a next determination process, and
when it is determined that the distance between the reference position and the current particular place is equal to or more than the combined display reference distance in the determination process, the process unit determines that the current particular place is the first particular place corresponding to the start point in the next combined display range.

18. A mobile device comprising:
a position detection unit that detects a position;
a physical quantity detection unit that detects a physical quantity;
a display unit that displays an image; and
a process unit that is able to perform a process of controlling the display unit so that the image is displayed,
wherein the process unit is able to perform an overlapping display process in which the process unit controls the display unit so as to display a physical quantity image expressing the physical quantity detected by the physical quantity detection unit in a manner of overlapping on a travel route image expressing a travel route that is determined depending on the position detected by the position detection unit, and
wherein the process unit is able to perform the display of a plurality of the physical quantity images in an overlapping and distinguishable manner for each predetermined unit time in the overlapping display process.

19. A wearable device comprising:
a communication unit capable of communicating with a mobile device including
a position detection unit that detects a position,
a display unit that displays an image, and
a process unit that is able to perform a process of controlling the display unit so that the image is displayed, the process unit being able to perform an overlapping display process in which the process unit controls the display unit so as to display a physical quantity image expressing a physical quantity in a manner of overlapping on a travel route image expressing a travel route that is determined depending on the position detected by the position detection unit; and
a physical quantity detection unit that detects the physical quantity,
wherein the communication unit transmits detected physical quantity information about the physical quantity detected by the physical quantity detection unit to the mobile device.

* * * * *